United States Patent
Gupta et al.

(10) Patent No.: US 12,511,752 B1
(45) Date of Patent: Dec. 30, 2025

(54) APPARATUS AND METHOD FOR AUTOMATICALLY VALIDATING QUALITY DATA ASSOCIATED WITH AT LEAST A SLIDE

(71) Applicant: Pramana, Inc., Cambridge, MA (US)

(72) Inventors: Raghubansh Bahadur Gupta, Bangalore (IN); Jithin Prems, Dooravani Nagar (IN); Rohan Prateek, Uttar Pradesh (IN); Pavani Pallavi Pelluru, Pocharam (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/975,926

(22) Filed: Dec. 10, 2024

(51) Int. Cl.
| | |
|---|---|
| *G06T 7/00* | (2017.01) |
| *A61B 10/00* | (2006.01) |
| *G06T 7/33* | (2017.01) |
| *G06V 10/24* | (2022.01) |
| *G06V 10/25* | (2022.01) |
| *G16H 10/40* | (2018.01) |

(52) U.S. Cl.
CPC ........ *G06T 7/0014* (2013.01); *A61B 10/0041* (2013.01); *G06T 7/337* (2017.01); *G06V 10/24* (2022.01); *G06V 10/25* (2022.01); *G16H 10/40* (2018.01); *G06T 2207/10056* (2013.01); *G06T 2207/10064* (2013.01); *G06T 2207/30024* (2013.01); *G06T 2207/30168* (2013.01); *G06V 2201/03* (2022.01); *G06V 2201/10* (2022.01)

(58) Field of Classification Search
None
See application file for complete search history.

(56) References Cited

U.S. PATENT DOCUMENTS

| | | |
|---|---|---|
| 8,160,348 B2 | 4/2012 | Pinard et al. |
| 8,565,503 B2 | 10/2013 | Eichhorn et al. |
| 2023/0206416 A1 | 6/2023 | Maier et al. |

FOREIGN PATENT DOCUMENTS

| | | | | |
|---|---|---|---|---|
| WO | 2013090567 A2 | 6/2013 | | |
| WO | 2014181347 A2 | 11/2014 | | |
| WO | WO-2021133847 A1 * | 7/2021 | ........ | G06F 18/24137 |
| WO | WO-2022251556 A1 * | 12/2022 | ........... | G06T 7/0012 |
| WO | WO-2023049471 A1 * | 3/2023 | ........... | G06F 16/164 |

OTHER PUBLICATIONS

Komura et al. in Computational and Structural Biotechnology Journal (2018) vol. 16:34-42.*
Niazi et al. "Digital Pathology and Artificial Intelligence" Lancet Oncol. (2019) vol. 20, May: e253-61.*
M. I. Samuelson et al Rapid Validation of Whole-Slide Imaging for Primary Histopathology Diagnosis Am J Clin Pathol. Jan. 29, 2021, p. 1-11.
Adela Saco et al Validation of Whole-Slide Imaging for Histolopathogical Diagnosis: Current State Pathobiology (2016) 83 (2-3): 89-98.

* cited by examiner

*Primary Examiner* — Lori A. Clow
(74) *Attorney, Agent, or Firm* — Caldwell Intellectual Property Law

(57) ABSTRACT

An apparatus and method for automatically validating quality data associated with at least a slide. The apparatus includes at least a processor and a memory communicatively connected to the at least a processor. The memory instructs the processor to receive, from the at least an optical device, at least a digital slide corresponding to the at least a slide, determine, using metadata, a slide identification, localize, using at least an object detection technique, the at least a digital slide, wherein localizing the at least a digital slide comprises identifying a stained core of interest and aligning the stained core of interest into a standard form, and, evaluate, using a predefined threshold, the stained core of interest, wherein evaluating comprises comparing the stained core of interest to a control core, generating a validation output, and transmitting the validation output to a downstream device.

18 Claims, 12 Drawing Sheets

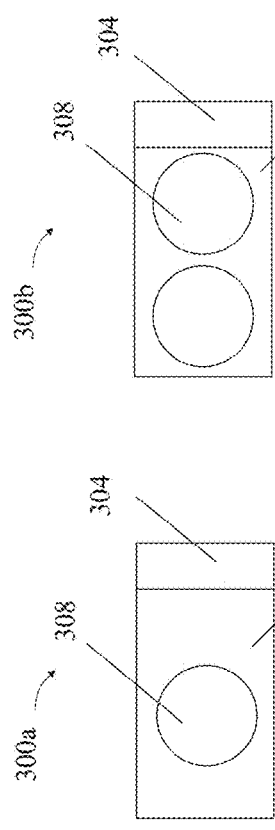
FIG. 3A
FIG. 3B
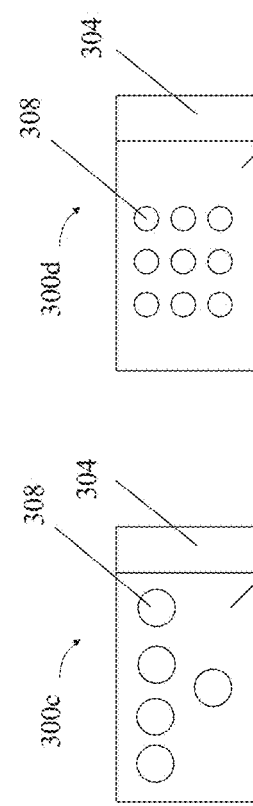
FIG. 3C
FIG. 3D
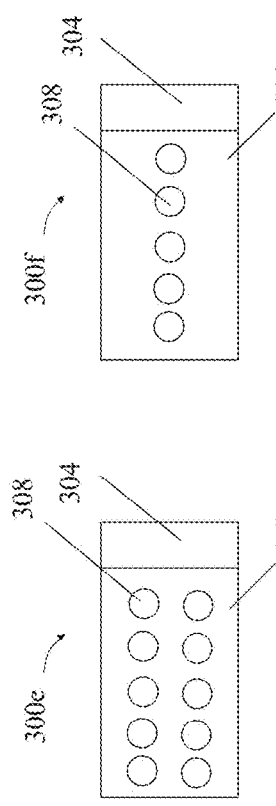
FIG. 3E
FIG. 3F

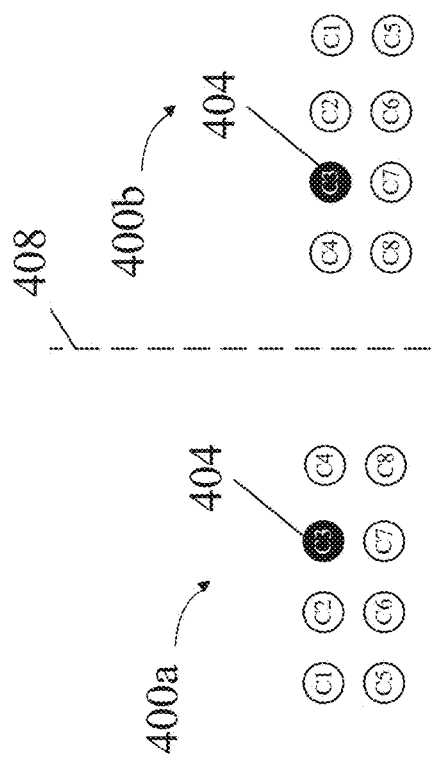
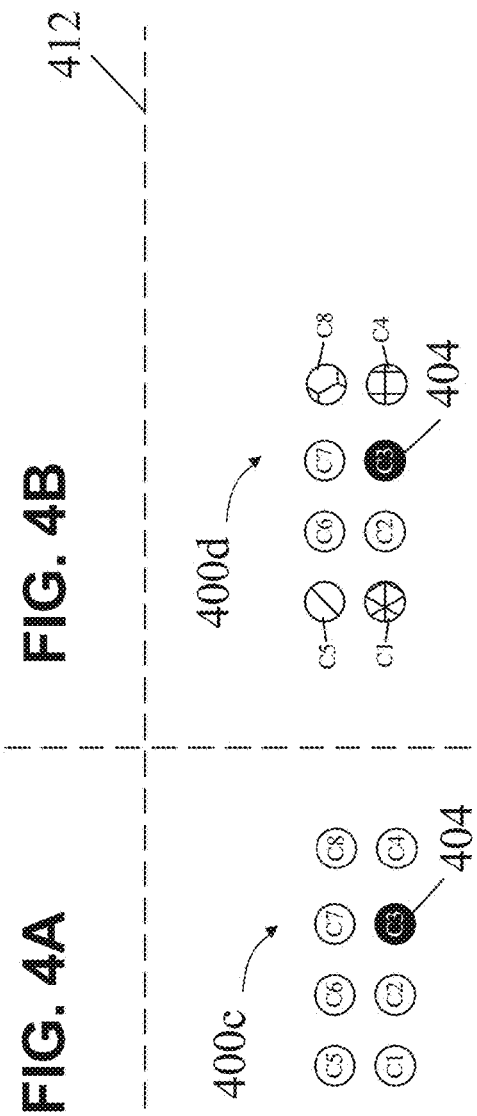

APPARATUS AND METHOD FOR AUTOMATICALLY VALIDATING QUALITY DATA ASSOCIATED WITH AT LEAST A SLIDE

FIELD OF THE INVENTION

The present invention generally relates to the field of pathology. In particular, the present invention is directed to an apparatus and a method for automatically validating quality data associated with at least a slide.

BACKGROUND

Traditional methods of validating quality data associated with slides often rely on manual inspection and subjective interpretation, leading to inconsistencies and inefficiencies in diagnostic workflows. Moreover, the lack of standardized processes for identifying and aligning stained cores into a reproducible form poses challenges in achieving accurate and reliable evaluation of digital slides.

SUMMARY OF THE DISCLOSURE

In an aspect, an apparatus for automatically validating quality data associated with at least a slide includes at least a processor and a memory communicatively connected to the at least a processor. The memory contains instructions configuring the processor to receive, from the at least an optical device, at least a digital slide corresponding to the at least a slide, determine, using metadata, a slide identification, localize, using at least an object detection technique, the at least a digital slide, wherein localizing the at least a digital slide comprises identifying a stained core of interest and aligning the stained core of interest into a standard form, and, evaluate, using a predefined threshold, the stained core of interest, wherein evaluating comprises comparing the stained core of interest to a control core, generating a validation output as a function of a comparison of the stained core of interest and the control core, and transmitting the validation output to a downstream device.

In another aspect, a method for automatically validating quality data associated with at least a slide includes receiving, from at least an optical device, at least a digital slide corresponding to at least a slide, determining, using metadata, a slide identification, localizing, using at least an object detection technique, the at least a digital slide, wherein localizing the at least a digital slide comprises identifying a stained core of interest and aligning the stained core of interest into a standard form, and evaluating, using a predefined threshold, the stained core of interest, wherein evaluating comprises comparing the stained core of interest to a control core, generating a validation output as a function of a comparison of the stained core of interest and the control core, and transmitting the validation output to a downstream device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3A is an exemplary illustration of a control tissue microarray with 1 core with a label;

FIG. 3B is an exemplary illustration of a control tissue microarray with two cores in a 1×2 matrix arrangement;

FIG. 3C is an exemplary illustration of a control tissue microarray with five cores in a 4×1 matrix and 1 matrix arrangement;

FIG. 3D is an exemplary illustration of a control tissue microarray with nine cores in a 3×3 matrix arrangement.

FIG. 3E is an exemplary illustration of a control tissue microarray with ten cores in a 2×5 matrix arrangement;

FIG. 3F is an exemplary illustration of a control tissue microarray with five cores in a 1×5 matrix arrangement;

FIG. 4A is an exemplary illustration of a 2×4 tissue microarray with a core of interest at position 3 for a given stain;

FIG. 4B is an exemplary illustration of a mirrored configuration along a vertical axis of a 2×4 tissue microarray with a core of interest appearing at row 1 column 2;

FIG. 4C is an exemplary illustration of a mirrored configuration along a horizontal axis of a 2×4 tissue microarray with a core of interest appearing at row 2 column 3;

FIG. 4D is an exemplary illustration of how a mirror configuration is detected using a texture and a color of specific cores;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for automatically validating quality data associated with at least a slide. The apparatus includes at least a computing device comprised of a processor and a memory communicatively connected to the processor. The memory instructs the processor to receive, from the at least an optical device, at least a digital slide corresponding to the at least a slide. The processor determines, using metadata, a slide identification. The processor localizes, using at least an object detection technique, the at least a digital slide, wherein localizing the at least a digital slide comprises identifying a stained core of interest and aligning the stained core of interest into a standard form. Additionally, the processor evaluates, using a predefined threshold, the stained core of interest, wherein evaluating comprises comparing the stained core of interest to a control core, generating a validation output as a function of a comparison of the stained core of interest and the control core, and transmitting the validation output to a downstream device.

Figure 1:
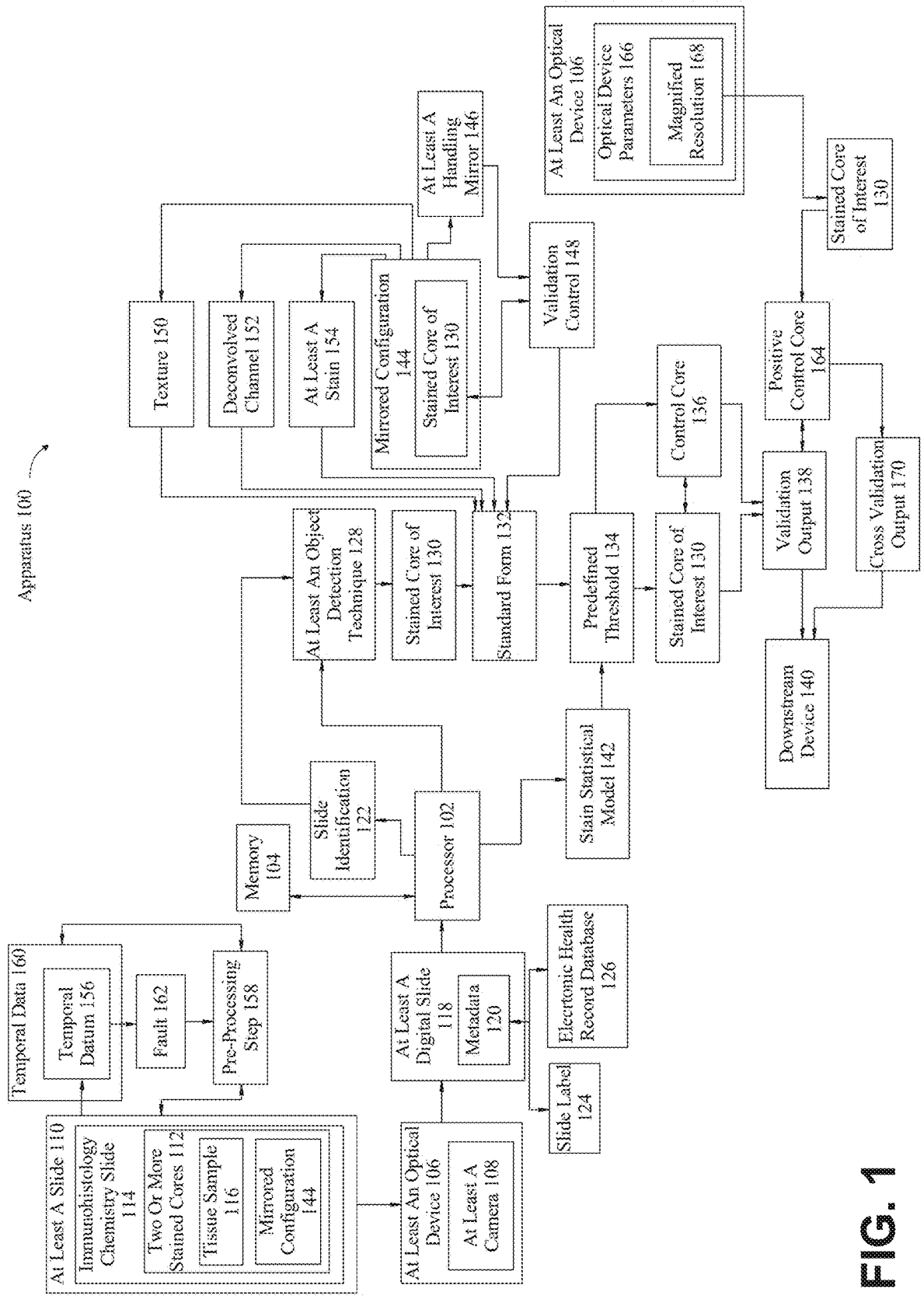
FIG. 1 is a block diagram of an apparatus for automatically validating quality data associated with at least a slide.

Referring now to FIG. 1, an exemplary embodiment of apparatus 100 for automatically validating quality data associated with at least a slide 110 is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 102. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, at least an optical device 106 comprising at least a camera 108 configured to scan at least a slide 110, wherein the at least a slide 110 comprises two or more stained cores 112. As used in this disclosure, an "optical device" is a device designed to manipulate, control, or utilize light. Without limitation, the light may include visible, ultraviolet, infrared light, and the like. In a non-limiting example, the optical device 106 may be employed to visualize, capture, or quantify features of tissue sample 116 arranged in an array format. the optical device 106 may be integral to processes like imaging, analysis, or spectroscopic assessment of the tissues. In another non-limiting example, the optical device 106 may include fluorescence microscope. Continuing, the fluorescence microscope may be used to visualize labeled biomarkers in tissue sample 116. For instance, a fluorescence microscope may be equipped with filters tailored to detect specific fluorophores could highlight the expression of proteins stained with fluorescent antibodies. In another non-limiting example, a digital slide scanner may serve as the optical device 106. Continuing, the digital slide scanner may include high-resolution optics to capture detailed images of entire tissue microarray slides, allowing for downstream digital analysis, such as quantification of stained regions using software tools. As used in this disclosure, a "tissue microarray" is a laboratory tool that consists of a paraffin block or other substrate containing multiple small tissue sample 116, arranged in a grid-like pattern, which are sectioned and mounted onto microscope slides for high-throughput analysis. The tissue sample 116 in the tissue microarray may be derived from different patients, experimental conditions, or anatomical sites, enabling simultaneous examination of multiple specimens under standardized conditions. Tissue microarrays may be used for applications such as biomarker discovery, drug testing, or comparative pathology studies. In another non-limiting example, the optical device 106 may include a spectrophotometer integrated with a tissue microarray analysis system to measure absorbance or reflectance properties of stained tissue spots, enabling quantitative assessment of biomarker concentration. As used in this disclosure, a "slide" is a flat piece of material designed to hold specimens or samples for examination, imaging, or analysis under an optical device 106 or related instrumentation. In a non-limiting example, the slide 110 may be made out of glass, plastic, and the like. In a non-limiting example, the slide 110 may be rectangular in shape. Without limitation, the slide 110 may be used to present tissue sections, cells, or other samples for microscopy or related studies. In a non-limiting example, the slide 110 may be a standard glass microscope slide measuring approximately 25×75 mm, used to hold tissue sections mounted with adhesives and covered with a coverslip for histological analysis. In another non-limiting example, the slide 110 may be a positively charged glass slide designed to enhance the adhesion of tissue sections or cells, which is particularly useful for immunohistochemistry (IHC) or in situ hybridization (ISH) applications. In another non-limiting example, the slide 110 may refer to a tissue microarray slide, where multiple small tissue cores are embedded in a paraffin block, sectioned, and mounted onto the slide 110. Continuing, this format may allow for the high-throughput analysis of multiple samples on a single slide. In another non-limiting example, the slide 110 may be a specialized digital pathology slide designed for use with whole-slide imaging scanners, enabling the digitization of sample images for computational or remote analysis. As used in this disclosure, "stained core" is a tissue core that has been treated with a specific stain or dye to highlight particular cellular, molecular, or structural features. As used in this disclosure, a "tissue core" is a sample or segment of biological tissue that is extracted for analysis, testing, or use. Without limitation, the stained core may be derived from a tissue microarray (TMA) and may be processed to make certain components, such as proteins, nucleic acids, or cellular structures, visible under an optical device 106 for diagnostic or research purposes. In a non-limiting example, the stained cores may be tissue cores treated with hematoxylin and eosin (H&E) stains. Continuing, hematoxylin stains cell nuclei blue, while eosin stains cytoplasmic and extracellular components pink, providing an overview of tissue morphology. In another non-limiting example, the stained cores may include tissue cores subjected to immunohistochemical (IHC) staining, where antibodies are used to detect specific proteins, and a chromogenic substrate, such as diaminobenzidine (DAB), produces a brown color to indicate the presence of the target protein. In another non-limiting example, the stained core may be fluorescence-labeled, where the tissue cores are treated with fluorescent dyes or antibodies conjugated with fluorophores, enabling visualization of specific molecular markers using a fluorescence microscope. Without limitation, in another example, the stained cores may include cores treated with special stains like Masson's trichrome for collagen or Periodic acid-Schiff (PAS) for carbohydrates, which are often used to identify specific histological components in tissue sample 116.

With continued reference to FIG. 1, in a non-limiting example, optical device 106 may be consistent with one or more aspects of the apparatus as described in U.S. patent application Ser. No. 18/382,345, filed on Oct. 20, 2023, titled "SYSTEM AND METHODS FOR DETECTING AND CLEANING CONTAMINANTS FROM AN IMAGING OPTICAL PATH," which is incorporated by reference herein in its entirety.

With continued reference to FIG. 1, the at least a slide 110 may include an immunohistology chemistry slide 114, wherein the two or more stained cores 112 of the immunohistology chemistry slide 114 may include a tissue sample 116. As used in this disclosure, an "immunohistology chemistry slide" is a prepared microscope slide used in immunohistochemistry (IHC) to analyze the presence and localization of specific antigens in biological tissues. As used in this disclosure, a "tissue sample" is a portion of biological tissue obtained from an organism. Without limitation, the tissue sample 116 may be derived from any organ, structure, or system within the organism and may include cellular, extracellular, and structural components. Continuing, the tissue sample 116 may be preserved, processed, or otherwise prepared to facilitate examination under specific experimental or diagnostic conditions. The immunohistology slide may include a tissue sample 116 affixed to its surface, which may be treated with antibodies that bind to the target antigen. Continuing, the bound antibodies may be visualized through chromogenic or fluorescent labeling methods, enabling detailed observation of molecular expression patterns and tissue architecture under a microscope. In a non-limiting example, the immunohistology chemistry slide 114 may be prepared using a sample of human breast tissue to detect the presence of estrogen receptors. The tissue sample 116 may be fixed on the immunohistology chemistry slide 114, treated with a primary antibody specific to the estrogen receptor, and then incubated with a secondary antibody conjugated to a chromogenic enzyme. The resulting color change may indicate the presence and distribution of estrogen receptors in the tissue. In another non-limiting example, the immunohistology chemistry slide 114 may be used in a study of neural tissue to identify amyloid-beta plaques, which are associated with Alzheimer's disease. The immunohistology chemistry slide 114 may be processed by applying an antibody specific to amyloid-beta, followed by a fluorescent dye-labeled secondary antibody. Under a fluorescence microscope, the immunohistology chemistry slide 114 may reveal the location and intensity of amyloid-beta deposits. Continuing the previous non-limiting example, the immunohistology chemistry slide 114 may be employed to investigate the expression of a cancer biomarker, such as HER2/neu, in a sample of gastric tissue. Continuing, after the tissue is adhered to the immunohistology chemistry slide 114, it may undergo a series of steps including antigen retrieval, antibody incubation, and chromogenic visualization. Without limitation, the results on the immunohistology chemistry slide 114 may assist pathologists in diagnosing the presence of HER2-positive cancer.

With continued reference to FIG. 1, the staining process for the immunohistology chemistry slide 114 may involve tissue fixation, sectioning, deparaffinization, antigen retrieval, blocking, antibody application, visualization using chromogenic or fluorescent substrates, and counterstaining before microscopic examination. For example, without limitation, the process may begin with the fixation of the tissue sample to preserve its structure and prevent degradation. Without limitation, the fixation of the tissue sample may include using a formalin solution. Continuing, the tissue may be embedded in paraffin to create a stable block for sectioning. Without limitation, thin sections of the tissue may be placed onto microscope slides. Without limitation, to prepare for staining, the paraffin may be removed through a deparaffinization process, which may involve treatment with xylene and alcohol. Continuing, the tissue section may then undergo antigen retrieval to unmask the epitopes, allowing antibodies to bind effectively. Without limitation, this step may involve heat-induced epitope retrieval (HIER) or enzymatic digestion. Continuing, a blocking solution may be applied to the tissue to minimize nonspecific binding of antibodies. Following this, the primary antibody, designed to bind specifically to the target antigen, may be applied to the immunohistology chemistry slide 114. After incubation, the immunohistology chemistry slide 114 may be washed to remove unbound antibodies. Without limitation, a secondary antibody, conjugated with a detection enzyme or fluorophore, may then be added to bind to the primary antibody. Finally, a chromogenic or fluorescent substrate may be introduced to visualize the antigen-antibody complex, producing a colored or fluorescent signal at the antigen's location. The immunohistology chemistry slide 114 may be counterstained to highlight general tissue morphology, mounted with a coverslip, and is typically ready for microscopic examination. Each of these steps might be optimized depending on the tissue type, target antigen, and detection system used.

Still referring to FIG. 1, the at least a processor 102 is configured to receive, from the at least an optical device 106, at least a digital slide 118 corresponding to the at least a slide 110. As used in this disclosure, a "digital slide" is a digital representation of a physical slide, created by scanning or imaging the physical slide using an optical or imaging device. Without limitation, the digital slide 118 may include visual data corresponding to the tissue sample 116, cells, or other specimens present on the physical slide, allowing for analysis, visualization, and sharing in a digital format. In a non-limiting example, the digital slide 118 may represent a digitally captured image or dataset that corresponds to the physical slide containing the tissue sample 116. Continuing, the processor 102 may be programmed to process, analyze, or store the digital slide 118, enabling the manipulation of visual data for diagnostic, research, or educational purposes. Without limitation, the optical device 106 may perform the initial capture of the slide features, which the processor 102 may then interpret or use in further computational tasks.

Still referring to FIG. 1, the at least a processor 102 is configured to determine, using metadata 120, a slide identification 122. As used in this disclosure, "metadata" is descriptive or structural information that provides context, attributes, or characteristics about a primary data set, object, or resource. Metadata 120 may include details such as creation date, author, file type, format, location, or specific parameters relevant to the primary data. Without limitation, metadata 120 may serve to facilitate the organization, discovery, management, or interpretation of the associated data. As used in this disclosure, a "slide identification" is a unique identifier associated with a specific slide. In a non-limiting example, the slide identification 122 may include the unique identifier for a microscope slide or a digital slide 118, that facilitates its recognition, tracking, and association with related data or metadata 120. Without limitation, the slide identification 122 may include alphanumeric codes, barcodes, QR codes, or electronic identifiers and may encompass details such as sample type, preparation date, patient or specimen information, and laboratory annotations. In a non-limiting example, the processor 102 may receive metadata 120 from the optical device 106 that includes information such as the scan date, magnification level, and a barcode embedded on the physical microscope slide. Continuing, using the metadata 120, the processor 102 may determine a slide identification 122, such as "SLD-20241130-001," where the prefix "SLD" denotes a slide 110, the date corresponds to when the slide 110 was scanned, and the numerical suffix provides a unique identifier for that specific slide. Continuing, the determined slide identification 122 may then be linked to its digital slide 118 and stored in a laboratory information management system (LIMS) for easy retrieval, ensuring traceability and accurate association with the corresponding patient or experimental data.

With continued reference to FIG. 1, in a non-limiting example, the metadata 120 being used to derive the slide identification 122 may be consistent with one or more aspects of the apparatus as described in U.S. patent application Ser. No. 18/774,574, filed on Jul. 16, 2024, titled "METHODS AND APPARATUS FOR ADAPTIVE SLIDE IMAGING USING A SELECTED SCANNING PROFILE," which is incorporated by reference herein in its entirety.

With continued reference to FIG. 1, determining the slide identification 122 may include extracting the metadata 120 from a slide label 124 using an image processing algorithm. As used in this disclosure, a "slide label" is a physical or digital marker associated with a microscope slide that provides identifying information about the contents, origin, or purpose of the slide 110. Without limitation, the slide label 124 may include text, alphanumeric codes, barcodes, or visual elements such as colors or symbols and may convey information such as the sample type, patient ID, preparation date, or experiment details. Continuing, the slide label 124 may be affixed directly to the slide 110 or digitally associated with its corresponding digital slide 118 in a database or software system. As used in this disclosure, an "image processing algorithm" is a computational procedure or set of rules designed to analyze, manipulate, or enhance digital images to extract useful information or improve image quality. In a non-limiting example, the image processing algorithm may perform operations such as filtering, segmentation, feature detection, pattern recognition, or transformation, enabling tasks such as object identification, noise reduction, or data extraction from visual inputs. Without limitation, the algorithm may be implemented in software, hardware, or a combination of both, and may be applied to various types of image data, including static images or video frames.

With continued reference to FIG. 1, in a non-limiting example, determining the slide identification 122 may include using the image processing algorithm to analyze a scanned image of the slide 110 and extract metadata 120 from the slide label 124 present on the slide 110. For instance, without limitation, the image processing algorithm may identify and decode a QR code printed on the slide label 124, extracting metadata 120 such as a unique slide number, patient ID, preparation date, and the like. Continuing, the metadata 120 may then be used by the processor 102 to determine the slide identification 122, which may be formatted as "QR20241130-045" to uniquely represent the slide 110 in a database. In another non-limiting example, the slide label 124 may contain human-readable text, such as a sample ID or experiment code, which may be captured in the digital slide 118 image. Continuing, the image processing algorithm may perform optical character recognition (OCR) on the label to extract the metadata 120. For example, without limitation, the algorithm may identify the text "Sample_ABC123" on the label and use it to determine the slide identification 122 "ABC123-01," linking the slide 110 to its associated metadata 120 in a database for traceability. Continuing the previous non-limiting example, an image processing algorithm may also enhance the scanned image to remove distortions or improve contrast in the slide label 124 before metadata 120 extraction. For example, without limitation, if the slide label 124 is partially obscured by glare or smudges, the image processing algorithm may apply filtering or edge detection techniques to clarify the text or code, ensuring accurate extraction of metadata 120 for determining the slide identification 122.

With continued reference to FIG. 1, determining the slide identification 122, using the metadata 120, may include extracting the slide identification 122 from an electronic health record database 126. As used in this disclosure, an "electronic health record database" is a digital repository designed to store, manage, and facilitate access to electronic health records (EHRs). Without limitation, the electronic health record database 126 may contain comprehensive and structured information about patients' medical histories, including demographics, diagnoses, treatment plans, test results, prescriptions, and other clinical data. Continuing, the electronic health record database 126 may be implemented to support healthcare providers in clinical decision-making, ensure data interoperability, and maintain secure, efficient storage and retrieval of patient health information. In a non-limiting example, determining the slide identification 122, using the metadata 120, may include querying an electronic health record database 126 to match the metadata 120 extracted from the slide label 124 with corresponding patient or sample information stored in the database. For instance, without limitation, the metadata 120 extracted from the slide label 124 may include a patient ID "P12345" and a biopsy date "2024 Nov. 30." The processor 102 may use this metadata 120 to search the electronic health record database 126, where it identifies an entry for "Patient ID: P12345" with a corresponding biopsy procedure performed on the same date. Continuing, the electronic health record database 126 may contain a pre-assigned slide identification 122, such as "BX123-20241130," which the processor 102 retrieves and associates with the slide 110. In another non-limiting example, the metadata 120 may include a specimen accession number, such as "A67890," linked to a histopathology report in the electronic health record database 126. The processor 102 may query the electronic health record database 126 using the accession number and retrieve the associated slide identification 122 "HIST-A67890-01," ensuring that the slide 110 and its digital representation are accurately matched to the patient and procedure details in the database.

Still referring to FIG. 1, the at least a processor 102 is configured to localize, using at least an object detection technique 128, the at least a digital slide 118, wherein localizing the at least a digital slide 118 comprises identifying a stained core of interest 130 and aligning the stained core of interest 130 into a standard form 132. As used in this disclosure, an "object detection technique" is a computational method used to identify and locate specific objects within an image or video. Without limitation, the object detection technique 128 may analyze pixel patterns, shapes, textures, or other visual features to classify objects and determine their positions, by generating bounding boxes or segmentation masks. Continuing the object detection technique 128 may employ algorithms based on traditional computer vision methods, such as edge detection or template matching, or advanced machine learning models, including convolutional neural networks (CNNs) or transformer architectures. As used in this disclosure, a "stained core of interest" is a specific region within a tissue sample 116 on a slide 110 that has been treated with staining agents to highlight particular cellular or molecular features for analysis. The stained core of interest 130 may correspond to an area of biological significance, such as a tumor region, a cluster of immune cells, or a specific structure within the tissue. Without limitation, the staining may involve chromogenic, fluorescent, or other contrast-enhancing techniques to make the core visually distinct, facilitating targeted examination or computational analysis of the highlighted features. As used in this disclosure, a "standard form" is a predefined and structured format used to represent, record, or communicate information in a consistent and uniform manner. Without limitation, the standard form 132 may include specified fields, layouts, or data entry rules to ensure clarity, comparability, and interoperability across different systems, users, or applications. The standard form 132 may be implemented physically, such as on paper, or digitally, such as in an electronic template or database schema. In a non-limiting example, the at least a processor 102 may use the object detection technique 128, such as a convolutional neural network, to analyze the at least a digital slide 118 and localize the stained core of interest 130. Continuing, the digital slide 118 may contain multiple tissue cores, and the object detection technique 128 may identify the core with a specific stain intensity or pattern indicative of a biological marker of interest, such as HER2 in breast cancer tissue. Once the stained core of interest 130 is identified, the processor 102 may align the core into a standard form 132, such as a rectangular or circular region, to ensure consistent orientation and scaling for subsequent analysis or reporting. In another non-limiting example, the processor 102 may localize a stained core of interest 130 on a digital slide 118 containing multiplex immunohistochemistry data. Without limitation, using an object detection technique 128 based on segmentation algorithms, the processor 102 may delineate the boundaries of the stained core that highlights a tumor microenvironment. After detecting the core, the processor may rotate, crop, and resize the stained core of interest 130 to align it within a standard form 132 template, such as a standardized aspect ratio or coordinate grid, for integration into a machine learning pipeline or comparison across datasets. In another non-limiting example, the processor 102 may also localize the stained core of interest 130 in a tissue microarray digital slide 118. Using an object detection technique 128, the processor 102 may identify a stained core based on color intensity thresholds from a chromogenic stain, such as hematoxylin and eosin (H&E). The processor 102 may then center and align the stained core of interest 130 into a standard form 132 with predefined dimensions, facilitating its inclusion in an automated scoring system or diagnostic workflow.

Still referring to FIG. 1, in some embodiments, apparatus 100 may include a machine vision system that includes at least a camera. A machine vision system may use images from at least a camera, to make a determination about a scene, space, and/or object. For example, in some cases a machine vision system may be used for world modeling or registration of objects within a space. In some cases, registration may include image processing, such as, without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ¢ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, in a non-limiting example, the processor 102 may be configured to determine characteristics such as the color, hue, or texture of the slide 110 using machine vision techniques or machine-learning algorithms. Continuing, the system may include an image-capturing component, such as a camera or sensor, that may collect visual data from the slide. The processor may analyze this data using trained machine-learning models, which may classify or quantify attributes like specific color values, surface patterns, or texture properties. This functionality may be employed to enhance the system's ability to assess, categorize, or display the slide's features for various applications, such as inventory management, quality control, or user personalization.

Still referring to FIG. 1, the at least a processor 102 is configured to evaluate, using a predefined threshold 134, the stained core of interest 130, wherein evaluating includes comparing the stained core of interest 130 to a control core 136, generating a validation output 138 as a function of a comparison of the stained core of interest 130 and the control core 136, and transmitting the validation output 138 to a downstream device 140. As used in this disclosure, a "predefined threshold" is a specified value or criterion set in advance that serves as a reference point for decision-making, comparison, or triggering an action. As used in this disclosure, a "control core" is a specific tissue sample 116 included in a tissue microarray that is used as a reference or standard to ensure the reliability, consistency, and accuracy of an analytical process. The control core 136 may represent known characteristics, such as a specific staining pattern, antigen expression level, or cellular composition, and may be used to validate experimental conditions, calibrate instruments, or compare results against the sample of interest. Without limitation, the control cores 136 may include positive controls, negative controls, or reference tissues selected for their consistent and well-characterized properties. As used in this disclosure, a "positive control" is a sample or experimental condition included in an analysis that is expected to produce a known, measurable response or outcome. The positive control may serve to confirm that the system, process, or assay is functioning correctly and is capable of detecting the phenomenon of interest. For example, without limitation, the positive control tissue may express the target antigen at a known level. As used in this disclosure, a "negative control" is a sample or experimental condition included in an analysis that is expected to produce no response or outcome. The negative control may help to identify false positives, ensure specificity, and verify that observed results are due to the intended experimental conditions. For instance, without limitation, the negative control tissue may lack the target antigen. As used in this disclosure, a "reference tissue" is a well-characterized tissue sample 116 used as a benchmark or standard in experiments or analyses. The reference tissue may provide a consistent baseline for comparison, ensuring uniformity and repeatability across multiple tests or samples. For example, without limitation, the reference tissue may be a standard sample from a healthy organ used to compare with diseased tissues. As used in this disclosure, a "validation output" is a result or data set generated by a system, process, or algorithm that serves to confirm the accuracy, reliability, or consistency of a procedure, model, or analysis. The validation output 138 may be compared against predefined standards, expected results, or ground truth data to assess whether the system or process performs as intended. The validation output 138 may include quantitative metrics, qualitative assessments, or visual representations, and may be used to identify errors, optimize performance, or ensure compliance with specified criteria. As used in this disclosure, "downstream device" is a device that accesses and interacts with apparatus 100. For instance, and without limitation, downstream device 140 may include a remote device and/or apparatus 100. In a non-limiting embodiment, downstream device 140 may be consistent with a computing device as described in the entirety of this disclosure.

With continued reference to FIG. 1, in a non-limiting example, the at least a processor 102 may evaluate a stained core of interest 130 from a digital slide 118 by comparing its staining intensity to a control core 136 using a predefined threshold 134. For instance, in a breast cancer diagnostic workflow, the stained core of interest 130 may be a tumor biopsy stained for HER2 expression, while the control core 136 may be a tissue sample 116 with a known level of HER2 expression (positive control). The processor 102 may use an image processing algorithm to measure the intensity of the stain in both cores and determine whether the stained core of interest 130 meets the predefined threshold 134 for HER2 positivity. Based on this comparison, the processor 102 may generate a validation output 138, such as "HER2 Positive" or "HER2 Negative," and transmit the validation output 138 to a downstream device 140, such as an electronic health record system or a reporting tool for review by a pathologist. In another non-limiting example, the processor 102 may evaluate a stained core of interest 130 in a tissue microarray study of immune response, where the predefined threshold 134 corresponds to the percentage of positively stained immune cells. The control core 136 may be a negative control tissue known to lack the target antigen. The processor 102 may compare the stained core of interest 130 against the control core 136 to ensure the staining is specific and not due to background noise or non-specific binding. The validation output 138 may include a quantified metric, such as "Percent Positive: 75%," and be transmitted to a downstream device 140, such as a data visualization platform for further analysis.

With continued reference to FIG. 1, wherein generating the validation output 138 may include utilizing a stain statistical model 142 configured to compute at least a predefined value, wherein the at least a predefined value is configured to validate the at least a digital slide 118. As used in this disclosure, a "stain statistical model" is a computational framework designed to analyze and interpret staining patterns, intensities, or distributions in tissue sample 116 by applying statistical methods. The stain statistical model 142 may incorporate quantitative metrics, such as mean intensity, variance, or percentage of positive areas, to evaluate staining characteristics and identify patterns or anomalies. The stain statistical model 142 may be used to classify samples, predict outcomes, or assess consistency across staining experiments, and may be trained on historical data or configured with predefined thresholds 134 to facilitate standardized and objective analysis. As used in this disclosure, "at least a predefined value" is a minimum quantity, measurement, or parameter that is established in advance to serve as a reference or criterion in a system, process, or analysis. The at least a predefined value may represent a threshold, baseline, or expected level that must be met or exceeded for a specific action, decision, or evaluation to occur. The at least a predefined value may be determined based on empirical data, theoretical considerations, or operational requirements and can be applied to various domains, such as image intensity, signal strength, or statistical metrics.

With continued reference to FIG. 1, in a non-limiting example, the stain statistical model 142 may be consistent with one or more aspects of the apparatus described in U.S. patent application Ser. No. 18/602,947, filed on Mar. 12, 2024, titled "SYSTEMS AND METHODS FOR INLINE QUALITY CONTROL OF SLIDE DIGITALIZATION," which is incorporated by reference herein in its entirety.

With continued reference to FIG. 1, in a non-limiting example, stain statistical model 142 may be consistent with one or more aspects of the apparatus described in U.S. patent application Ser. No. 18/513,079, filed on Nov. 17, 2023, titled "SYSTEM AND METHODS FOR COLOR GAMUT NORMALIZATION FOR PATHOLOGY SLIDES," which is incorporated by reference herein in its entirety.

In a non-limiting example, the at least a processor 102 may utilize the stain statistical model 142 to compute at least a predefined value for a digital slide 118 stained for HER2 expression. The stain statistical model 142 may analyze the color intensity and distribution within the stained core of interest 130 by referencing historical data from multiple positive control slides that exhibit consistent and validated HER2 staining patterns. Continuing, using this data, the stain statistical model 142 may calculate threshold values for acceptable staining intensity and uniformity, enabling the processor 102 to determine whether the staining quality meets predefined quality standards. If the computed value exceeds the threshold, the processor 102 may validate the digital slide 118 and send it to the pathologist for review. If the value falls below the threshold, the processor 102 may flag the slide 110 for restaining to ensure accuracy and consistency. In another non-limiting example, the stain statistical model 142 may be applied to a digital slide 118 stained for CD8 expression. As used in this disclosure, "CD8 expression" is the production and presence of CD8 glycoproteins on the surface of CD8+ T cells, which are a subset of cytotoxic T lymphocytes. CD8 expression may include a biological marker indicative of the activation or prevalence of these immune cells within a tissue or biological sample. Measuring CD8 expression using immunohistochemistry (IHC), flow cytometry, or molecular assays, may be used to assess immune response, characterize the tumor microenvironment, or evaluate the efficacy of immunotherapeutic interventions. Continuing, the previous non-limiting example, the digital slide 118 stained for CD8 expression may provide that the predefined value represents the minimum acceptable percentage of positively stained immune cells within the core of interest. The stain statistical model 142 may be developed by analyzing data from multiple CD8-positive slides and may compute the percentage of positive areas and compare it to the predefined threshold 134 for quality assurance. If the computed percentage meets or exceeds the threshold, the processor 102 may validate the slide 110 and transmit it to the pathologist. Conversely, if the percentage is below the threshold, the slide 110 may be marked as a quality control failure and routed for restaining or additional processing. In another non-limiting example, the processor 102 may perform inline automated quality control by using the stain statistical model 142 to compute metrics such as stain uniformity and background noise for a tissue microarray slide. As used in this disclosure, "inline automated quality control" is a process that integrates real-time evaluation of data, products, or results into an operational workflow to ensure quality standards are met without interrupting or delaying the process. Inline automated quality control may use computational algorithms, statistical models, and/or machine learning techniques to assess predefined criteria, such as thresholds, patterns, or consistency metrics. In a non-limiting example, inline automated quality control may involve analyzing staining quality, detecting artifacts, and/or validating data against predefined thresholds 134 to determine whether a slide 110 is suitable for further analysis or requires corrective actions, such as restaining. The predefined value for quality validation may include both intensity thresholds and acceptable noise levels, calculated from positive controls. The processor 102 may validate the slide 110 if the staining process achieves both thresholds, and it may trigger an automated workflow to restrain the slide 110 if either metric is outside the acceptable range, ensuring high-quality results are delivered to the pathologist. As used in this disclosure, "intensity thresholds" are predefined values that represent the minimum or maximum allowable levels of signal intensity within an image. In a non-limiting example, the intensity threshold may be used to evaluate or segment regions of interest. Without limitation, the intensity thresholds may refer to the brightness, color saturation, or optical density of a stained region and are used to determine whether the staining meets specific criteria for quality, positivity, or other metrics.

With continued reference to FIG. 1, the stain statistical model 142 may be stain-specific. Without limitation, the stain statistical model 142 may be stain-specific by being tailored to analyze characteristics unique to the stain applied. For example, without limitation, when applied to HER2 expression, the stain statistical model 142 may be trained using historical data from multiple HER2-positive control slides. Continuing, these slides may exhibit consistent and validated staining patterns, enabling the stain statistical model 142 to identify specific intensity and distribution patterns associated with HER2. Similarly, for CD8 expression, the stain statistical model 142 may analyze the prevalence of positively stained immune cells by referencing data from CD8-positive control slides. This specificity allows the stain statistical model 142 to set predefined thresholds tailored to each stain type, ensuring accurate evaluation of staining quality and consistency based on the biological markers of interest.

Figure 5A:
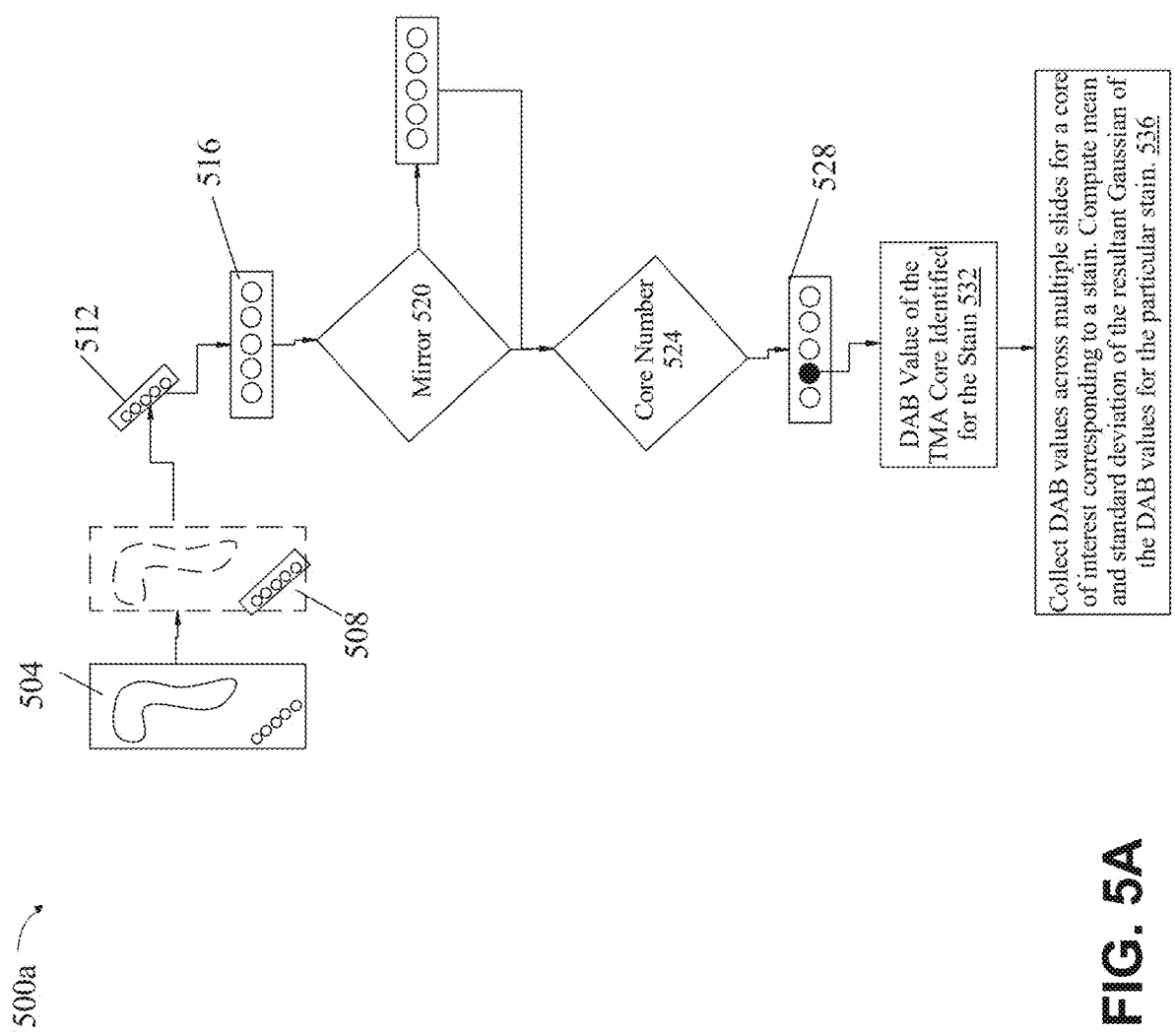
FIG. 5A is an exemplary illustration depicts the workflow for computing DAB values for each stain.
Figure 5B:
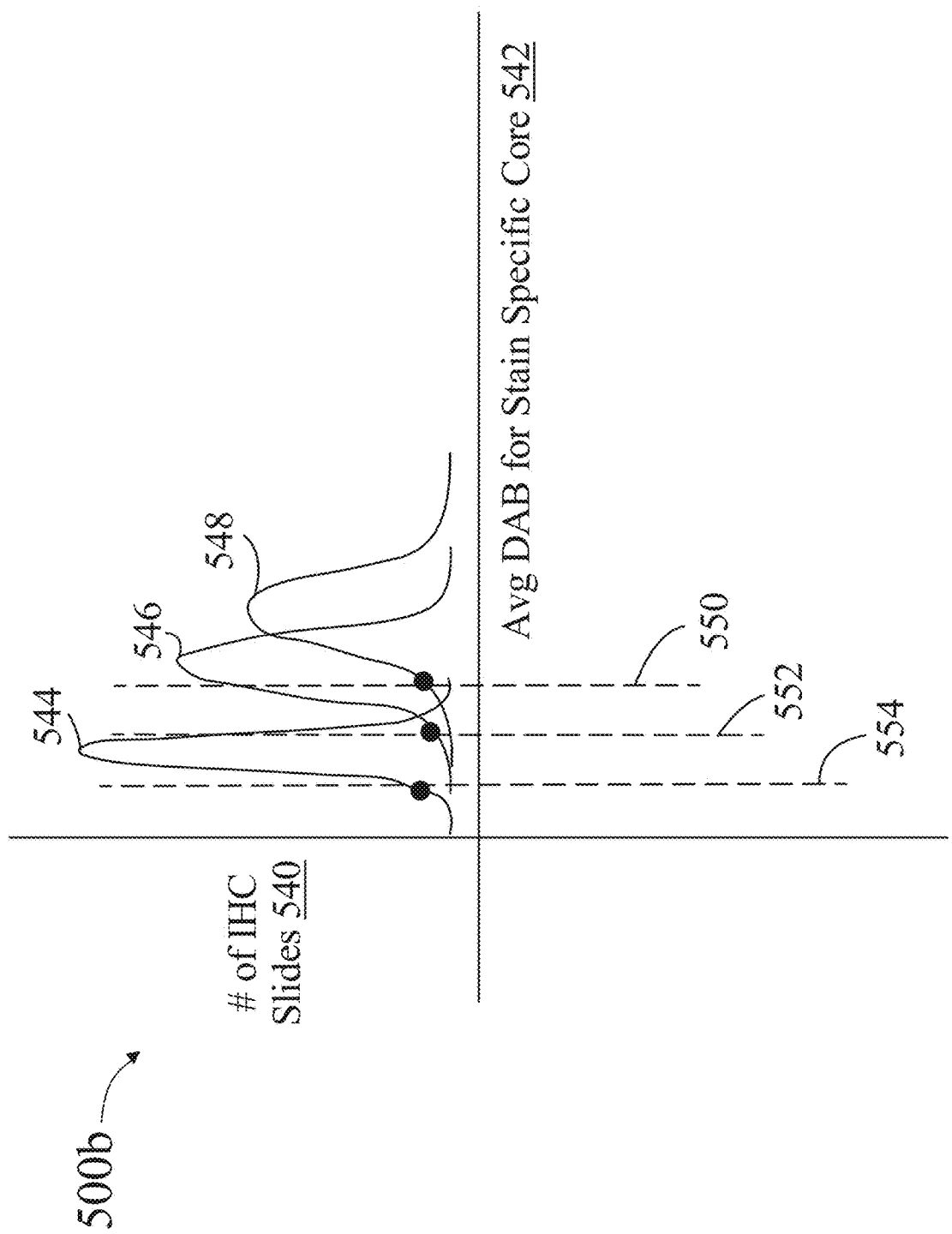
FIG. 5B is an exemplary illustration depicts the statistical models for multiple stains.

With continued reference to FIG. 1, the determination of the DAB value for the stained core of interest 130 may involve a series of analytical steps performed by the processor 102. First, the processor 102 may extract color data from the stained core of interest 130 on the digital slide 118, focusing on metrics such as color intensity, distribution, and uniformity within the stained region. Continuing, this extracted data may then be compared to reference datasets using the stain statistical model 142. Without limitation, the reference datasets may include validated staining patterns and acceptable variations derived from positive control slides tailored to the specific stain type, such as HER2 or CD8. Based on this comparison, the stain statistical model 142 may calculate predefined intensity thresholds or acceptable percentage values for positive staining, which may include metrics like the minimum percentage of positively stained cells or acceptable ranges for stain uniformity and background noise. The processor 102 may subsequently compute the DAB value for the stained core of interest 130, representing staining intensity, optical density, brightness, or other quantifiable metrics indicative of stain performance. Continuing, the computed DAB value may be compared to the predefined threshold 134. Without limitation, if the value meets or exceeds the predefined threshold 134, the slide 110 may be validated and sent to the pathologist for review. Conversely, if the value falls below the predefined threshold 134, the slide 110 may be flagged for restaining or additional processing to ensure the results meet the required quality and consistency standards. This process of determining the DAB value for the stained core of interest 130 is illustrated in FIG. 5A-B.

With continued reference to FIG. 1, aligning the stained core of interest 130 may include one or more of rotating the at least a digital slide 118, translating the at least a digital slide 118, and reflecting the at least a digital slide 118. For instance, without limitation, if a tissue sample 116 on the digital slide 118 is scanned at an angle, the processor 102 may detect the stained core of interest 130 and apply a rotational transformation to align the stained core of interest 130 vertically or horizontally, facilitating consistent analysis and comparison across slides. In another non-limiting example, aligning the stained core of interest 130 may involve translating the at least a digital slide 118 to center the stained core of interest 130 within the field of view. For example, if the stained core of interest 130 is located off-center in the scanned image, the processor 102 may adjust the position of the digital slide 118 by shifting it along the x- and y-axes so that the stained core of interest 130 is optimally positioned within a predefined frame for analysis. In another non-limiting example, aligning the stained core of interest 130 may also include reflecting the at least a digital slide 118 to correct for mirrored orientations. For instance, without limitation, if a digital slide 118 is scanned with the tissue section flipped or mirrored, the processor 102 may identify the stained core of interest 130 and apply a reflection transformation to restore the correct orientation. This ensures that the stained core of interest 130 aligns with reference data or standard forms 132, enabling accurate assessment and downstream processing.

With continued reference to FIG. 1, the apparatus may be further configured to align the two or more stained cores 112 comprising a mirrored configuration 144 into the standard form 132 by identifying, using metadata 120, the stained core of interest 130, using at least a handling mirror 146, and overlaying a validation control 148 on the stained core of interest 130. As used in this disclosure, a "mirrored configuration" is an arrangement in which the orientation of an object, image, or structure is reversed along a specified axis, creating a reflection of the original. Without limitation, the mirrored configuration 144 may occur when a slide 110 image is flipped horizontally, vertically, or both, such that the positions or orientations of features appear inverted relative to their true arrangement. Correcting a mirrored configuration 144 may involve applying image transformations, such as reflection or flipping, to restore the original orientation for accurate analysis or comparison. As used in this disclosure, a "handling mirror" is a reflective device or surface configured to assist in the manipulation, positioning, or alignment of objects by providing a visual reflection. The handling mirror 146 may be used to enable precise adjustments or observations, particularly in environments where direct access or visibility to the object is limited. As used in this disclosure, a "validation control" is a reference or benchmark used to verify the accuracy, consistency, or reliability of a process, system, or output. The validation control 148 may include predefined parameters, known standards, or reference samples that are evaluated alongside the primary subject of analysis to ensure that the system or process operates as intended. In the context of staining or imaging workflows, a validation control 148 may involve control cores 136, predefined thresholds 134, and/or statistical models used to confirm the validity of results before proceeding with further analysis or decision-making. In a non-limiting example, the apparatus may align two or more stained cores 112 comprising a mirrored configuration 144 into the standard form 132 during tissue microarray visualization for quality control (QC). The apparatus may first identify the stained core of interest 130 using metadata 120, such as the core's unique identifier or its spatial position within the TMA grid. For instance, the metadata 120 may specify the row and column location of a specific core corresponding to a HER2-positive sample. Continuing, to address the mirrored configuration 144, the apparatus may utilize a handling mirror 146 to virtually reflect the stained core of interest 130, ensuring that its orientation matches the expected standard form 132. For example, if the mirrored configuration 144 places the top-right corner of the stained core on the bottom-left, the handling mirror 146 may flip the core horizontally and vertically to restore its correct alignment. The apparatus may then overlay a validation control 148 on the stained core of interest 130. This could involve superimposing QC values, such as staining intensity metrics or positive area percentages, directly onto the digital image of the stained core. Additionally and or alternatively, thresholds derived from a stain statistical model 142 may be displayed alongside the QC values, such as a color-coded bar indicating whether the stained core meets or fails the predefined threshold 134 for acceptable staining quality.

With continued reference to FIG. 1, aligning the two or more stained cores 112 may include the mirrored configuration 144 into the standard form 132 comprises using a texture 150 of the two or more stained cores 112, a deconvolved channel 152, and at least a stain 154. As used in this disclosure, "texture" is a characteristic of an image or material that describes the spatial arrangement, patterns, or variations in intensity or color of its surface. Texture 150 may include features such as smoothness, roughness, granularity, or repetition of specific structures within a region of interest. Without limitation, the texture 150 may be quantified using computational techniques that evaluate properties like contrast, correlation, or frequency components, making it useful for identifying or classifying objects based on their visual patterns. As used in this disclosure, a "deconvolved channel" is a processed representation of an image that isolates specific components or signals corresponding to individual stains or markers by separating overlapping colors or spectral data. Deconvolution techniques may be applied to remove noise or distinguish between stains, such as separating DAB (diaminobenzidine) and hematoxylin signals in a stained tissue sample 116. The deconvolved channel 152 may allow for more accurate analysis of the specific stain's contribution to the image, facilitating targeted evaluation of biomarkers or cellular features. As used in this disclosure, a "stain" is a chemical or biological agent applied to a tissue sample 116 to enhance the visibility of specific structures, cells, or molecules under a microscope. The at least a stain 154 may bind to particular components of the tissue, such as proteins, nucleic acids, or membranes, producing a distinct color or fluorescence. Examples of the at least a stain 154 may include hematoxylin for nuclei, cosin for cytoplasm, and DAB for immunohistochemical detection of antigens. Stains 154 may be used to highlight features of interest for diagnostic, research, or quality control purposes. In a non-limiting example, aligning two or more stained cores 112 in a mirrored configuration 144 into the standard form 132 may involve analyzing the texture 150 of the cores and utilizing a deconvolved channel 152 for precise orientation. For instance, without limitation, in a tissue microarray where the cores are arranged symmetrically, a mirrored configuration 144 may arise due to scanning errors. The processor 102 may evaluate the texture 150 patterns of peripheral cores, such as glandular structures or stromal arrangements, to identify the mirrored cores. Additionally and or alternatively, the processor 102 may apply color deconvolution to isolate the DAB channel, which highlights the target stain, thereby enabling robust detection of positivity and proper reorientation of the mirrored configuration 144. In another non-limiting example, the processor 102 may use both texture 150 and deconvolved DAB and hematoxylin channels to align the stained cores. For a core stained with a biomarker like HER2, the DAB channel may indicate positivity in the cell membrane, while the hematoxylin channel provides a structural reference by highlighting nuclei. The processor 102 may analyze these features to reorient the mirrored core and align it with a standard form 132 for subsequent analysis, ensuring that the core's orientation matches the correct biological interpretation. In another non-limiting example, the processor 102 may perform high-magnification analysis on cores identified as positive to eliminate false positives. For example, without limitation, the texture 150 of the core may initially suggest positivity due to staining artifacts or background noise. The processor 102 may analyze the cell membrane, cytoplasm, and nucleus staining within the deconvolved DAB and hematoxylin channels to confirm true biomarker expression. If the positivity is found to be due to non-specific staining, the processor 102 may flag the core for quality control, ensuring accurate reporting and reducing diagnostic errors.

With continued reference to FIG. 1, a temporal datum 156 associated with the at least a slide 110 may be used to determine which pre-processing step 158 generated a fault 162 associated the at least a slide 110 by chronologically organizing temporal data 160 associated with the at least a slide 110, chronologically organizing the pre-processing step 158 corresponding to the temporal data 160, and identifying, using the temporal datum 156, the pre-processing step 158 corresponding to the fault 162. As used in this disclosure, a "temporal datum" is a piece of information that specifies a time-related attribute or event associated with an object, process, or system. In a non-limiting example, the temporal datum 156 may include timestamps, durations, or sequences indicating when specific actions, such as staining, scanning, or data transfer, occurred. As used in this disclosure, a "pre-processing step" is an operation or procedure performed on an object or data before its primary analysis or use. For example, without limitation, pre-processing steps 158 may include activities such as tissue sectioning, staining, slide labeling, scanning, or image enhancement. Without limitation, the pre-processing step 158 may be aimed at preparing the slide 110 or its digital representation for downstream processes. As used in this disclosure, a "fault" is a deviation from expected behavior, quality, or performance in a system, process, or object. Without limitation, the fault 162 may result from errors, defects, or failures during operations and may manifest as artifacts in a digital slide 118, incorrect metadata 120, or improper staining quality. In a non-limiting example, the temporal datum 156 associated with the at least a slide 110 may include a timestamp marking the completion of a staining process. Continuing, the temporal datum 156 may be used to determine which pre-processing step 158 generated the fault 162 by organizing all temporal data 160 related to the slide 110, such as timestamps for tissue sectioning, staining, and scanning. The processor 102 may chronologically order these temporal data 160 points alongside corresponding pre-processing steps 158. For instance, if the fault 162 manifests as irregular staining intensity in the digital slide 118, the processor 102 may match the timestamp of the staining process to the observed fault 162. Without limitation, by correlating the fault 162 to the staining pre-processing step 158, the apparatus may flag the staining operation as the source of the issue, enabling targeted corrective actions.

With continued reference to FIG. 1, further configured to cross-validate a positive control core 164 of the validation output 138, wherein cross-validation comprises configuring one or more optical device parameters 166 of the optical device 106 as a function of the stained core of interest 130 and the positive control core 164, scanning, using the at least an optical device 106, the stained core of interest 130 at a magnified resolution 168, comparing the stained core of interest 130 against the approved value, and generating a cross-validation output 170. As used in this disclosure, a "positive control core" is a reference component or standard within a system, process, or experimental setup that is designed to consistently exhibit a known or expected positive outcome. The positive control core 164 may serve as a benchmark to validate the functionality, reliability, or accuracy of the primary elements being tested or analyzed within the system. Continuing, the positive control core 164 may serve as a benchmark against which the stained core of interest 130 is compared during evaluation. As used in this disclosure, "optical device parameters" are configurable settings or attributes of an optical device that determine its performance or output during the scanning or imaging of an object. In a non-limiting example, the optical device parameters 166 may include resolution, magnification level, focal plane, light intensity, or scanning speed. Continuing, by adjusting the optical device parameters 166, it may ensure accurate and high-quality imaging tailored to the specific attributes of the stained core. As used in this disclosure, a "magnified resolution" is the level of detail captured in an image as a result of increasing the optical or digital magnification during scanning or imaging. In a non-limiting example, the magnified resolution 168 may allow for detailed visualization of cellular or subcellular structures, such as membranes, cytoplasm, or nuclei, enabling precise assessment of staining quality or biomarker expression. As used in this disclosure, a "cross-validation output" is a result generated by re-evaluating or verifying a validation output using additional data, alternative methods, or refined criteria. In a non-limiting example, the cross-validation output 170 may confirm the consistency and reliability of the validation process by incorporating high-resolution scans, optimized optical device parameters 166, or comparisons against approved values 164 to ensure accurate conclusions. In a non-limiting example, further configuring to cross-validate the validation output 138 may involve adjusting the optical device parameters 166, such as increasing the magnification level and optimizing the focal plane, to scan a stained core of interest 130 at a magnified resolution 168. For instance, if the validation output 138 for a HER2-stained tissue sample 116 indicates borderline positivity based on low-resolution scans, the processor 102 may reconfigure the optical device 106 to scan the stained core of interest 130 at 40× magnification. The resulting high-resolution image may reveal finer details of cell membrane staining, allowing the processor 102 to compare the findings against an approved value, such as a predefined threshold 134 for HER2 expression. A cross-validation output 170, such as "HER2 Positive Confirmed" or "Revalidation Required," may then be generated and transmitted to a downstream device 140 for further action. In another non-limiting example, cross-validation may involve using optical device parameters 166 to enhance the brightness and contrast settings while scanning a stained core of interest 130 at a magnified resolution 168.

For a TMA core stained for CD8 immune cell markers, the optical device 106 may be configured to capture detailed cytoplasmic and nuclear features, enabling precise quantification of positively stained cells. The processor 102 may then compare these detailed findings against the approved value, such as a threshold for CD8 positivity percentage. The cross-validation output 170, such as "Positive Rate: 85%, Validated," may ensure that the validation process is consistent and accurate. In another non-limiting example, a stained core of interest 130 flagged as potentially over-stained during initial validation may be re-evaluated through cross-validation. The processor 102 may configure the optical device 106 to scan the core at multiple focal depths, ensuring a comprehensive analysis of the staining layers. The magnified resolution 168 scans may then be compared against approved values 164 for acceptable staining intensity and uniformity. Based on the findings, a cross-validation output 170 may be generated, such as "Over-Staining Confirmed" or "Staining Within Acceptable Range," ensuring the integrity of the QC process.

With continued reference to FIG. 1, in a non-limiting example, the expected outcomes from implementing stain quality control for control cores 136 and stained cores of interest may include several benefits. Batch control may assist the technician operating the stainer machine in evaluating the accuracy of the pre-processing step 158, while per-slide control may provide additional assurance to both the technician and the pathologist. For instance, the pathologist may evaluate a slide 110 with greater confidence when a control core 136 is stained alongside the tissue sample 116 on the same slide. The stain QC process may also offer a quantitative assessment of the staining process, enabling technicians to independently decide whether a slide 110 requires restaining. Additionally and or alternatively, tissue microarray visualization for QC may be streamlined through TMA orientation correction, the use of handling mirrors 146, and the overlaying of validation outputs 138 on the stained core of interest 130, paired with at least a predefined value. Stain statistical models 142 may be employed to compute at least a predefined value, allowing for automated QC decisions, such as determining whether to send a digital slide 118 to the pathologist or to flag it for restaining. Without limitation, by reviewing digital slides 118 stained across various pre-processing steps 158, stains, and tissue types, laboratory managers may leverage temporal data 160 to identify potential process improvements. Once a technician approves a digital slide 118 as positively stained, pathologists may verify the staining's accuracy by examining validation controls 148 for the control core 136 at higher magnifications, such as 40X. High-magnification scanning of the stained core of interest 130 may further assist in analyzing features like the cell membrane, cytoplasm, and nucleus, helping pathologists identify and eliminate faults 162, thereby enhancing diagnostic accuracy.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2A:
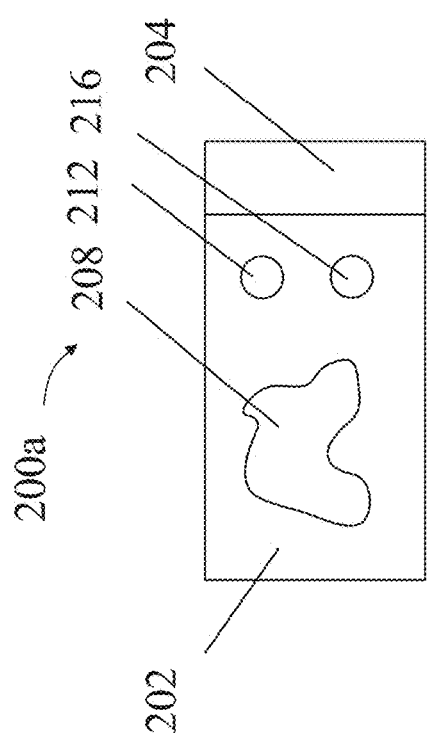
FIG. 2A is an exemplary illustration of a per slide control tissue microarray.

Referring now to FIG. 2A, an exemplary illustration 200a of a per slide control tissue microarray. In an embodiment, the illustration 200a includes a slide 202. In an embodiment, the illustration 200a includes a label 204. In an embodiment, the illustration 200a includes a tissue sample. In an embodiment, the illustration 200a includes a positive control core 212. In an embodiment, the illustration 200a includes a negative control core 216. In an embodiment, each prepared tissue sample 208 may be placed on a slide 202 alongside corresponding positive control core 212 and negative control core 216. In an embodiment, the positive control core 212 and the negative control core 216 may be strategically included to assess the quality of the slide preparation and staining process. In an embodiment, the positive control core 212 may confirm the presence of target staining under optimized conditions, while the negative control core 216 may ensure specificity by verifying the absence of non-specific staining. In an embodiment, the illustration 200a may demonstrate that the number of cores included per slide can vary depending on the experimental or diagnostic requirements, allowing flexibility in the design of the control configuration. In an embodiment, the setup enables accurate evaluation of staining quality and slide preparation, ensuring reliable interpretation of results.

Figure 2B:
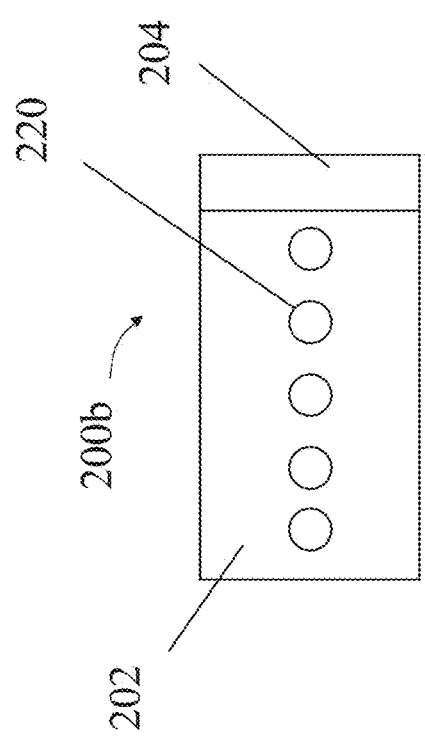
FIG. 2B is an exemplary illustration of a batch control tissue microarray.

Referring now to FIG. 2B, an exemplary illustration 200b of a batch control tissue microarray. In an embodiment, the illustration 200b includes a slide 202. In an embodiment, the illustration 200b includes a label 204. In an embodiment, the illustration 200b includes multiple control cores 220 arranged to represent a batch control configuration. In an embodiment, the multiple control cores 220 may include a range of tissue types and staining variations representative of the batch being processed. In an embodiment, the batch control tissue microarray may include five control cores 220, though the number of cores may vary depending on the experimental or diagnostic needs. In an embodiment, the multiple control cores 220 may be used to evaluate the overall consistency and accuracy of the staining process across the entire batch of slides. In an embodiment, the batch control setup may account for staining process variations by comparing the results from different cores within the same batch. In an embodiment, the batch control tissue microarray may account for inherent variations in tissue types, ensuring that the staining results are accurate and reproducible for all samples in the batch. In an embodiment, the inclusion of a batch control slide may provide technicians with a robust means of assessing the performance of the stainer machine. In an embodiment, the pathologist may benefit indirectly by having confidence in the consistency of the batch-wide staining process when reviewing individual slides, as the batch control slide ensures that the overall process quality is validated.

Referring now to FIG. 3A, an exemplary illustration 300a of a control tissue microarray with 1 core with a label. In an embodiment, the illustration 300a includes a slide 302. In an embodiment, the illustration 300a includes a label 304 affixed to the slide 302 for identification. In an embodiment, the illustration 300a includes a core 308 placed on the slide 302.

Referring now to FIG. 3B, an exemplary illustration 300b of a control tissue microarray with two cores in a 1×2 matrix arrangement. In an embodiment, the illustration 300b includes a slide 302. In an embodiment, the illustration 300b includes a label 304 affixed to the slide 302 for identification. In an embodiment, the illustration 300b includes two cores in a 1×2 matrix arrangement 308 placed on the slide 302.

Referring now to FIG. 3C, an exemplary illustration 300c of a control tissue microarray with five cores in a 4×1 matrix and 1 matrix arrangement. In an embodiment, the illustration 300c includes a slide 302. In an embodiment, the illustration 300c includes a label 304 affixed to the slide 302 for identification. In an embodiment, the illustration 300c includes five cores in a 4×1 matrix and 1 matrix arrangement 308 placed on the slide 302.

Referring now to FIG. 3D, an exemplary illustration 300d of a control tissue microarray with nine cores in a 3×3 matrix arrangement. In an embodiment, the illustration 300d includes a slide 302. In an embodiment, the illustration 300d includes a label 304 affixed to the slide 302 for identification. In an embodiment, the illustration 300d includes nine cores in a 3×3 matrix arrangement 308 placed on the slide 302.

Referring now to FIG. 3E, an exemplary illustration 300e of a control tissue microarray with ten cores in a 2×5 matrix arrangement. In an embodiment, the illustration 300c includes a slide 302. In an embodiment, the illustration 300e includes a label 304 affixed to the slide 302 for identification. In an embodiment, the illustration 300e includes ten cores in a 2×5 matrix arrangement 308 placed on the slide 302.

Referring now to FIG. 3F, an exemplary illustration 300f of a control tissue microarray with five cores in a 1×5 matrix arrangement. In an embodiment, the illustration 300f includes a slide 302. In an embodiment, the illustration 300f includes a label 304 affixed to the slide 302 for identification. In an embodiment, the illustration 300f includes five cores in a 1×5 matrix arrangement 308 placed on the slide 302.

Referring now to FIG. 4A, an exemplary illustration 400a of a 2×4 tissue microarray with a core of interest at position 3 for a given stain. In an embodiment, the illustration 400a includes a core of interest 404 at position 3 for a given stain.

Referring now to FIG. 4B, an exemplary illustration 400b of a mirrored configuration along a vertical axis of a 2×4 tissue microarray with a core of interest appearing at row 1 column 2. In an embodiment, the illustration 400b includes a core of interest 404 appearing at row 1 column 2. In an embodiment, the illustration 400b shows a spatial displacement along a vertical axis 408.

Referring now to FIG. 4C, an exemplary illustration 400c of a mirrored configuration along a horizontal axis of a 2×4 tissue microarray with a core of interest appearing at row 2 column 3. In an embodiment, the illustration 400c includes a core of interest 404 appearing at row 2 column 3. In an embodiment, the illustration 400c shows a spatial displacement along a horizontal axis 412.

Referring now to FIG. 4D, an exemplary illustration 400d of how a mirror configuration is detected using a texture and a color of specific cores. In an embodiment, the illustration 400d includes a core of interest 404. In an embodiment, the illustration 400d includes multiple cores, where specific cores, such as C1, C4, C5, and C8, are used to identify mirror configurations. In an embodiment, the detection process may analyze the texture patterns of these cores, such as structural or spatial features, along with their color characteristics, to determine whether the cores are in a mirrored configuration. In an embodiment, this identification may facilitate the correction of mirrored orientations, ensuring proper alignment of the tissue samples for accurate downstream analysis.

Referring now to FIG. 5A, an exemplary illustration 500a depicts the workflow for computing DAB values for each stain. In an embodiment, the illustration 500a includes identifying, from a whole slide image 504, a control tissue microarray 508. In an embodiment, a control TMA 508 is extracted 512. In an embodiment, a control TMA 508 is oriented to a standard format 516. In an embodiment, the illustration 500a includes performing mirror correction 520 to align the TMA cores correctly. In an embodiment, the DAB value of the TMA core identified by a core number 524 for the respective stain is computed. In an embodiment, DAB values are collected across multiple positive slides for the core of interest 528 corresponding to a particular stain. For example, without limitation, the DAB values for core C2 may be collected across multiple slides for a particular stain 532. In an embodiment, the workflow includes calculating the mean and standard deviation for the collected DAB values as part of the statistical modeling process 536.

Referring now to FIG. 5B, an exemplary illustration 500b depicts the statistical models for multiple stains. In an embodiment, the illustration 500b includes a vertical axis of the number of immunohistochemistry slides 540. In an embodiment, the illustration 500b includes a horizontal axis of the average DAG for stain specific core 542. In an embodiment, the illustration 500b includes graphical representations of DAB values for each stain, depicted as Gaussian curves 544, 546, and 548. In an embodiment, the mean and standard deviation 554, 552, and 550 for each stain are calculated and maintained separately within the model. In an embodiment, the statistical model uses the mean and standard deviation for a given stain to decide whether a new slide is positive for that stain. In an embodiment, this decision is based on a threshold value calculated using the formula: Threshold Value=Mean±(2×Standard Deviation).

Figure 6:
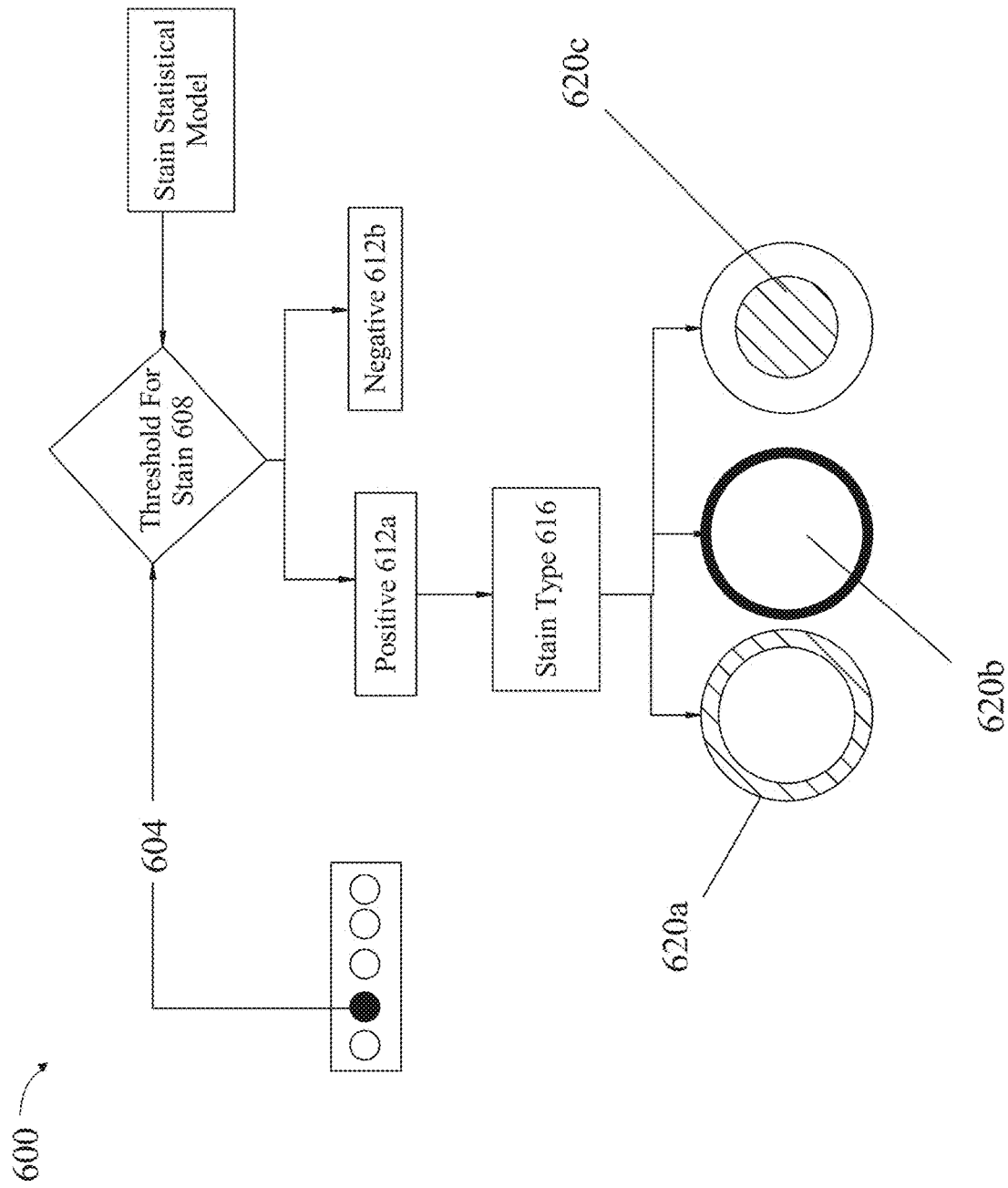
FIG. 6 is an exemplary illustration a workflow for quality control of a new slide.

Referring now to FIG. 6, an exemplary illustration 600 a workflow for quality control of a new slide. In an embodiment, the illustration 600 includes a process for comparing the DAB value of a stained tissue microarray core for a particular stain 604 with a threshold value 608 associated with the respective stain. In an embodiment, if the DAB value for the stain exceeds the threshold value 608, the TMA core is considered positive 612a. In an embodiment, if the DAB value for the stain is less than the threshold value 608, the TMA core is considered negative 612b. In an embodiment, the positive core 612a is subsequently assessed at a magnified resolution to evaluate false positivity. In an embodiment, based on the type of stain 616, the assessment at higher magnification may involve cross-checking the staining location on specific cellular structures, such as the cytoplasm 620a, cell membrane 620b, and nucleus 620c. In an embodiment, the determination of false positivity may ensure accurate validation of the TMA core, contributing to reliable interpretation of the staining results.

Figure 7:
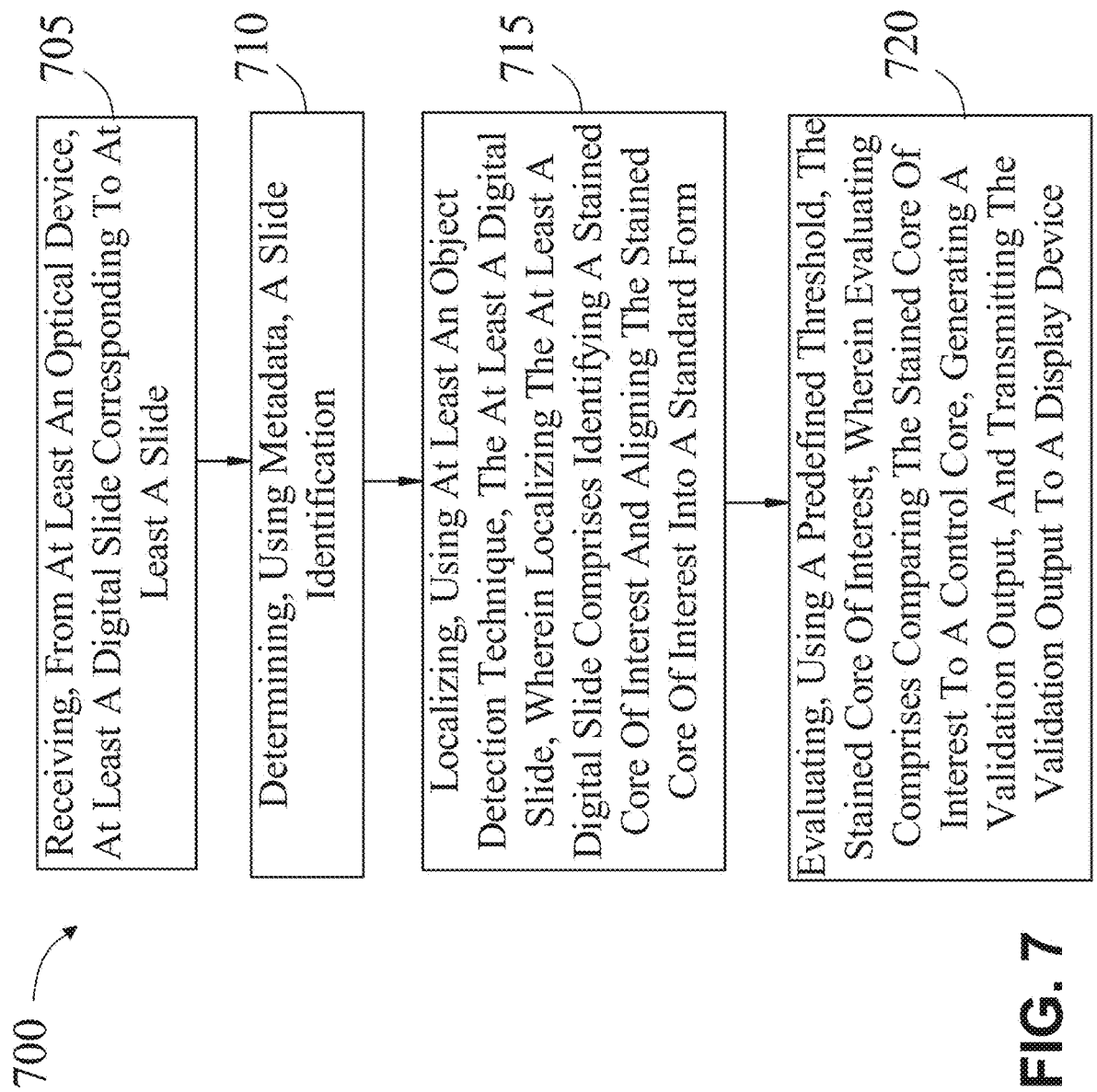
FIG. 7 is a block diagram of an exemplary method for automatically validating quality data associated with at least a slide.

Referring now to FIG. 7, a flow diagram of an exemplary method 700 for automatically validating quality data associated with at least a slide is illustrated. At step 705, method 700 includes receiving, from at least an optical device, at least a digital slide corresponding to at least a slide. This may be implemented as described and with reference to FIGS. 1-6.

Still referring to FIG. 7, at step 710, method 700 includes determining, using metadata, a slide identification. This may be implemented as described and with reference to FIGS. 1-6.

Still referring to FIG. 7, at step 715, method 700 includes localizing, using at least an object detection technique, the at least a digital slide, wherein localizing the at least a digital slide comprises identifying a stained core of interest and aligning the stained core of interest into a standard form. This may be implemented as described and with reference to FIGS. 1-6.

Still referring to FIG. 7, at step 720, method 700 includes evaluating, using a predefined threshold, the stained core of interest, wherein evaluating comprises comparing the stained core of interest to a control core, generating a validation output as a function of a comparison of the stained core of interest and the control core, and transmitting the validation output to a downstream device. This may be implemented as described and with reference to FIGS. 1-6.

Figure 8:
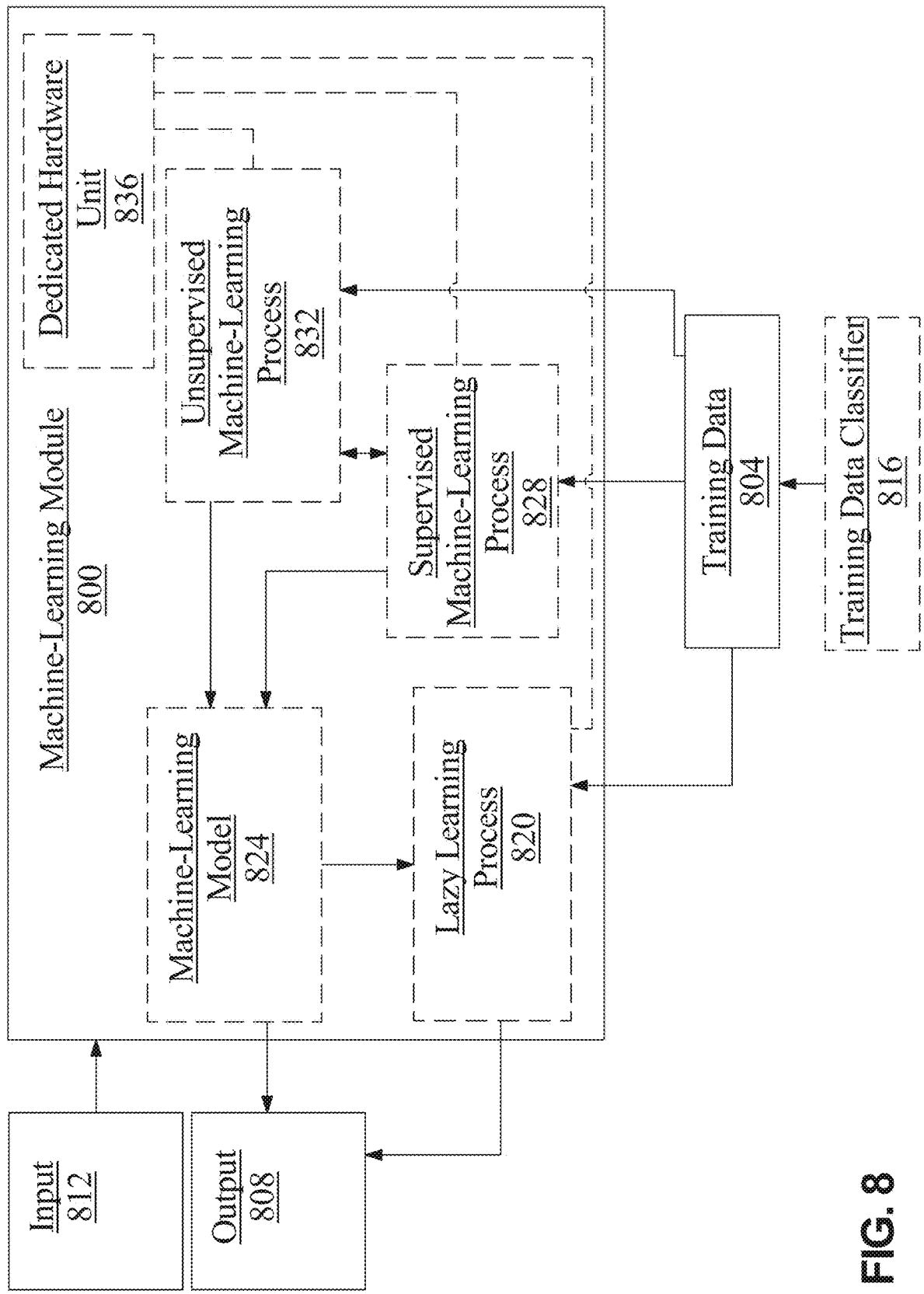
FIG. 8 is a block diagram of an exemplary machine-learning process.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm instantiated in hardware or software logic, data structures, and/or functions that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example inputs may include the at least a slide 110 and outputs may include a characteristic of the at least a slide 110 such as texture, hue, and the like.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 816 may classify elements of training data to categories of texture.

Still referring to FIG. 8, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 8, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 8, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 8, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 8, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 8, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 8, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 8, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 8, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 8, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 8, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include the at least a slide as described above as inputs, a characteristic of the at least a slide like texture classification, hue classification, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

With further reference to FIG. 8, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 8, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 832 may not require a response variable; unsupervised processes 832 may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 8, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 8, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 8, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 8, one or more processes or algorithms described above may be performed by at least a dedicated hardware unit 836. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 836 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 836 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 836 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 9:
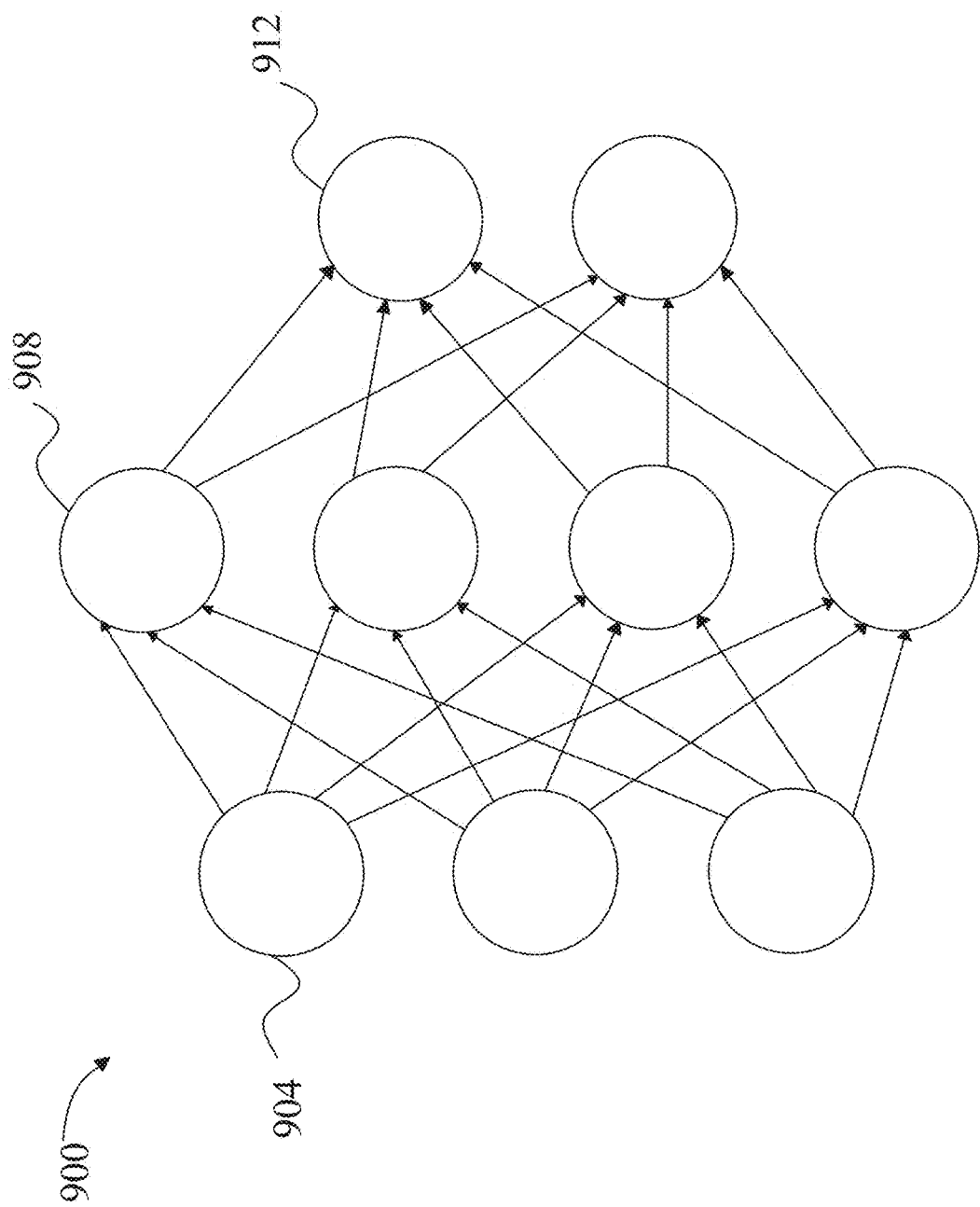
FIG. 9 is a diagram of an exemplary embodiment of a neural network.

Referring now to FIG. 9, an exemplary embodiment of neural network 900 is illustrated. A neural network 900 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 904, one or more intermediate layers 908, and an output layer of nodes 912. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 10:
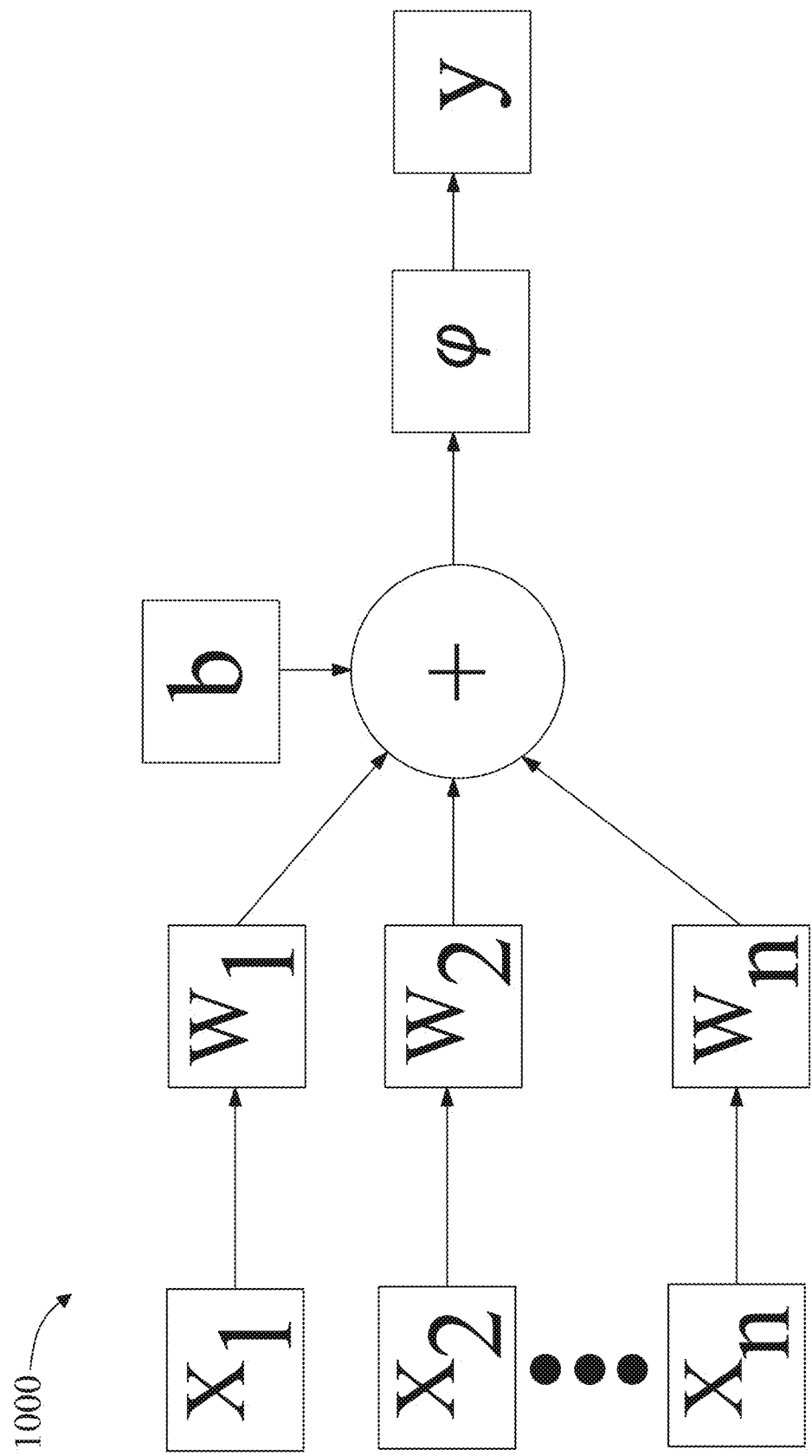
FIG. 10 is a diagram of an exemplary embodiment of a node of a neural network.

Referring now to FIG. 10, an exemplary embodiment of a node 1000 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
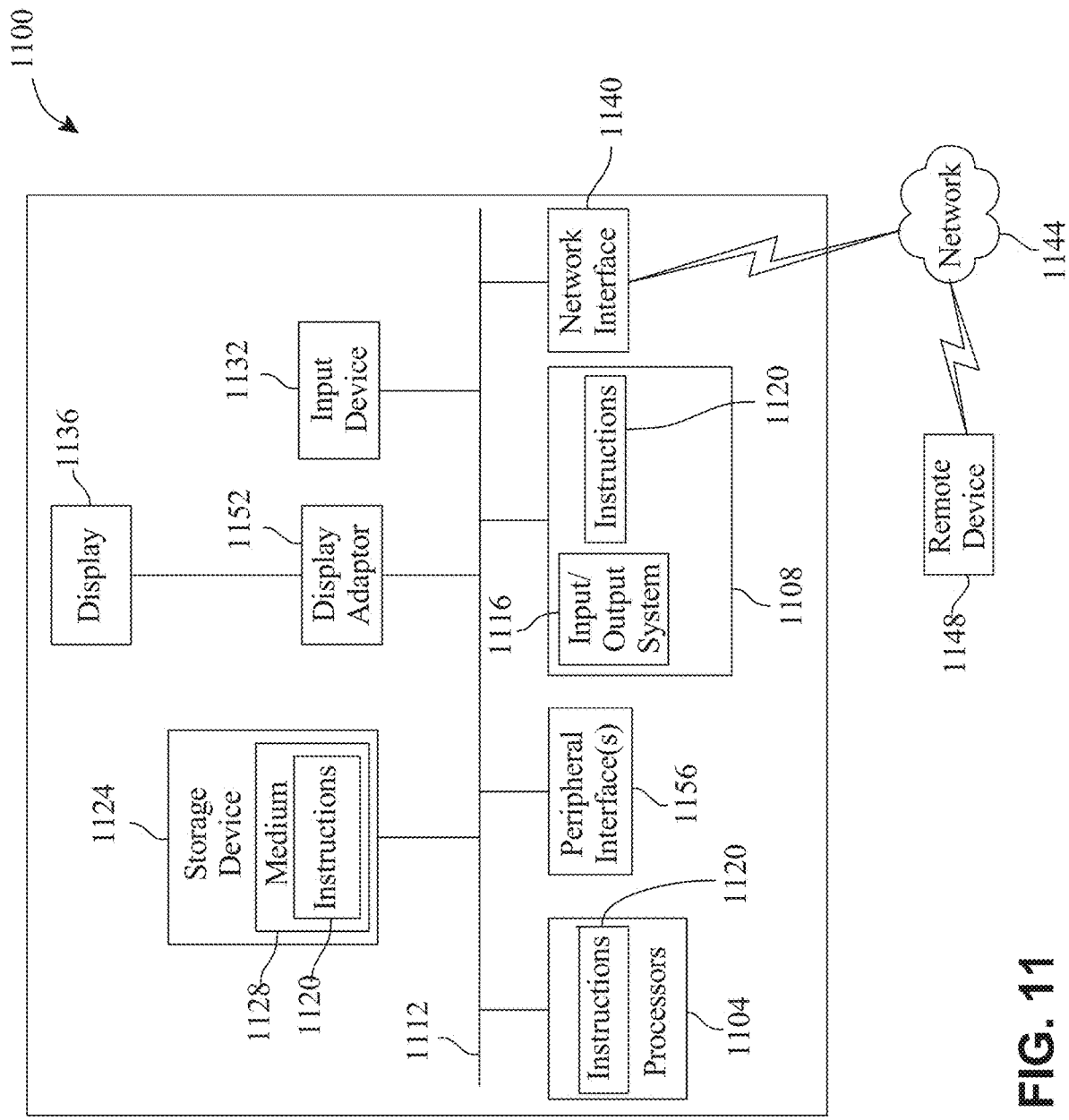
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automatically validating quality data associated with at least a slide, wherein the apparatus comprises:
   at least an optical device comprising at least a camera configured to scan at least a slide, wherein the at least a slide comprises two or more stained cores, wherein scanning the at least a slide creates at least a digital slide corresponding to the at least a slide;
   at least a computing device communicatively connected to the at least an optical device, wherein the computing device comprises:
      a memory; and
      at least a processor communicatively connected to the memory, wherein the memory contains instructions configuring the at least a processor to:
         receive, from the at least an optical device, at least a digital slide corresponding to the at least a slide;
         determine, using metadata, a slide identification;
         localize, using at least an object detection technique, the at least a digital slide, wherein localizing the at least a digital slide comprises:
            identifying a stained core of interest from the two or more stained cores; and
            aligning the stained core of interest into a standard form, wherein the standard form comprises at least data entry rules; and
         evaluate, using a predefined threshold, the stained core of interest, wherein evaluating comprises:
            comparing the stained core of interest to a control core;
            generating a validation output as a function of a comparison of the stained core of interest and the control core and wherein generating the validation output comprises utilizing a stain statistical model configured to compute at least a predefined value, wherein the at least a predefined value is configured to validate the at least a digital slide;
         transmitting the validation output to a display device;
         cross-validating a positive control core of the validation output to confirm a reliability of the validation output, wherein cross-validation comprises:
            configuring one or more optical device parameters comprising at least a magnification level and scanning speed of the optical device as a function of the stained core of interest and the positive control core, wherein the optical device parameters are adjusted to ensure accurate specific attributes of the stained core;
            scanning, using the at least an optical device, the stained core of interest at a magnified resolution;
            comparing the stained core of interest against the control core; and
            generating a cross-validation output; and
         transmitting the cross-validation output to a display device for further action.

2. The apparatus of claim 1, wherein the at least a slide comprises an immunohistology chemistry slide, wherein the two or more stained cores of the immunohistology chemistry slide comprises a tissue sample.

3. The apparatus of claim 1, wherein determining the slide identification comprises extracting the metadata from a slide label using an image processing algorithm.

4. The apparatus of claim 1, wherein determining the slide identification, using the metadata, comprises extracting the slide identification from an electronic health record database.

5. The apparatus of claim 1, wherein aligning the stained core of interest comprises one or more of rotating the at least a digital slide, translating the at least a digital slide, and reflecting the at least a digital slide.

6. The apparatus of claim 1, wherein the apparatus is further configured to align the stained core of interest comprising a mirrored configuration into the standard form by:
   identifying, using metadata, the stained core of interest;
   using at least a handling mirror; and
   overlaying a validation control on the stained core of interest.

7. The apparatus of claim 6, wherein aligning the two or more stained cores comprising the mirrored configuration into the standard form comprises using a texture of the two or more stained cores, a deconvolved channel, and at least a stain.

8. The apparatus of claim 1, wherein a temporal datum associated with the at least a slide is used to determine which of a plurality of pre-processing steps generated a fault associated with the at least a slide by:
  chronologically organizing temporal data associated with the at least a slide;
  chronologically organizing the plurality of pre-processing steps corresponding to the temporal data; and
  identifying, using the temporal datum, a pre-processing step, of the plurality of pre-processing steps, corresponding to the fault.

9. The apparatus of claim 1, further configured to cross-validate a positive control core of the validation output, wherein cross-validation comprises:
  configuring one or more optical device parameters of the optical device as a function of the stained core of interest and the positive control core;
  scanning, using the at least an optical device, the stained core of interest at a magnified resolution;
  comparing the stained core of interest against the control core; and
  generating a cross-validation output.

10. A method for automatically validating quality data associated with at least a slide, wherein the method comprises:
  receiving, from at least an optical device, at least a digital slide corresponding to at least a slide wherein the at least a slide comprises two or more stained cores;
  determining, using metadata, a slide identification;
  localizing, using at least an object detection technique, the at least a digital slide, wherein localizing the at least a digital slide comprises:
    identifying a stained core of interest from the two or more stained cores; and
    aligning the stained core of interest into a standard form; and
  evaluating, using a predefined threshold, the stained core of interest, wherein evaluating comprises:
    comparing the stained core of interest to a control core;
    generating a validation output as a function of a comparison of the stained core of interest and the control core and wherein generating the validation output comprises utilizing a stain statistical model configured to compute at least a predefined value, wherein the at least a predefined value is configured to validate the at least a digital slide;
    transmitting the validation output to a downstream device;
    cross-validating a positive control core of the validation output to confirm a reliability of the validation output, wherein cross-validation comprises:
      configuring one or more optical device parameters comprising at least a magnification level and scanning speed of the optical device as a function of the stained core of interest and the positive control core, wherein the optical device parameters are adjusted to ensure accurate specific attributes of the stained core;
      scanning, using the at least an optical device, the stained core of interest at a magnified resolution;
      comparing the stained core of interest against the control core; and
      generating a cross-validation output; and
    transmitting the cross-validation output to a display device for further action.

11. The method of claim 10, wherein the at least a slide comprises an immunohistology chemistry slide, wherein the two or more stained cores of the immunohistology chemistry slide comprises a tissue sample.

12. The method of claim 10, wherein determining the slide identification comprises extracting the metadata from a slide label using an image processing algorithm.

13. The method of claim 10, wherein determining the slide identification, using the metadata, comprises extracting the slide identification from an electronic health record database.

14. The method of claim 10, wherein aligning the stained core of interest comprises one or more of rotating the at least a digital slide, translating the at least a digital slide, and reflecting the at least a digital slide.

15. The method of claim 10, further configured to align the stained core of interest comprising a mirrored configuration into the standard form by:
  identifying, using metadata, the stained core of interest;
  using at least a handling mirror; and
  overlaying a validation control on the stained core of interest.

16. The method of claim 15, wherein aligning the two or more stained cores comprising the mirrored configuration into the standard form comprises using a texture of the two or more stained cores, a deconvolved channel, and at least a stain.

17. The method of claim 10, wherein a temporal datum associated with the at least a slide is used to determine which of a plurality of pre-processing steps generated a fault associated with the at least a slide by:
  chronologically organizing temporal data associated with the at least a slide;
  chronologically organizing the plurality of pre-processing steps corresponding to the temporal data; and
  identifying, using the temporal datum, a pre-processing step, of the plurality of pre-processing steps, corresponding to the fault.

18. The method of claim 10, further configured to cross-validate a positive control core of the validation output, wherein cross-validation comprises:
  configuring one or more optical device parameters of the optical device as a function of the stained core of interest and the positive control core;
  scanning, using the at least an optical device, the stained core of interest at a magnified resolution;
  comparing the stained core of interest against the control core; and
  generating a cross-validation output.

* * * * *